United States Patent [19]
Pan

[11] Patent Number: 5,907,820
[45] Date of Patent: *May 25, 1999

[54] SYSTEM FOR ACQUIRING AND ANALYZING A TWO-DIMENSIONAL ARRAY OF DATA

[75] Inventor: Shaoher X Pan, San Jose, Calif.

[73] Assignee: Applied Materials, Inc., Santa Clara, Calif.

[*] Notice: Under 35 U.S.C. 154(b), the term of this patent shall be extended for 00 days.

[21] Appl. No.: 08/621,279

[22] Filed: Mar. 22, 1996

[51] Int. Cl.⁶ .............................. G06F 17/00; H01L 21/66
[52] U.S. Cl. ........................... 702/155; 702/31; 364/146; 364/188; 204/298.32
[58] Field of Search .............................. 364/550, 551.01, 364/552, 554, 496–500, 188, 146, 468.28; 204/192.33, 192.34, 192.35, 298.32; 438/5, 1, 10, 14, 16, 17; 702/155, 31, 32

[56] References Cited

U.S. PATENT DOCUMENTS

| | | | |
|---|---|---|---|
| 4,805,089 | 2/1989 | Lane et al. | 364/188 |
| 4,967,381 | 10/1990 | Lane et al. | 364/551.01 |
| 5,014,217 | 5/1991 | Savage | 364/498 |
| 5,347,460 | 9/1994 | Gifford et al. | 364/468 |
| 5,548,322 | 8/1996 | Gifford | 364/497 |
| 5,658,423 | 8/1997 | Angell et al. | 438/9 |

*Primary Examiner*—John Barlow
*Assistant Examiner*—Bryan Bui
*Attorney, Agent, or Firm*—Thomason & Moser

[57] ABSTRACT

A system for acquiring and displaying which represents a two-dimensional array of data in an intuitive graphical display, where the graphical display is controlled through a plurality of display interfaces. Specifically, the system acquires data representing a phenomenon such as a plasma, processes that data and displays the data, in real-time, in one of a number of user selectable graphical formats. The data, once acquired, can be further processed by editing, filtering and smoothing. Such processed data can then be "replayed" such that a user can compare various sets of data acquired under various test scenarios. Additionally, the system is used to control and optimize a plasma within plasma generating equipment.

33 Claims, 24 Drawing Sheets

FIG. 6

| Test Confi | POLY | | | | | | | |
|---|---|---|---|---|---|---|---|---|
| Date | 1/4/96 | | | | | | | |
| Time | 8:27 PM | | | | | | | |
| Sampling | 10 | Hertz | | | | | | |
| Source Po | 0 | Watts | | | | | | |
| Bias Powe | 0 | Watts | | | | | | |
| DC Bias | 0 | Volts | | | | | | |
| Probe Bia | 80 | Volts | | | | | | |
| Pressure | 0 | mT | | | | | | |
| Cathode T | 0 | degrees C | | | | | | |
| Wall Temp | 0 | degrees C | | | | | | |
| Gas #1 | | | | | | | | |
| | Gas Name | | | | | | | |
| | Flow Rate | 0 | sccm | | | | | |
| Gas #2 | | | | | | | | |
| | Gas Name | | | | | | | |
| | Flow Rate | 0 | sccm | | | | | |
| Gas #3 | | | | | | | | |
| | Gas Name | | | | | | | |
| | Flow Rate | 0 | sccm | | | | | |
| Gas #4 | | | | | | | | |
| | Gas Name | | | | | | | |
| | Flow Rate | 0 | sccm | | | | | |
| Gas #5 | | | | | | | | |
| | Gas Name | | | | | | | |
| | Flow Rate | 0 | sccm | | | | | |
| Gas #6 | | | | | | | | |
| | Gas Name | | | | | | | |
| | Flow Rate | 0 | sccm | | | | | |
| Description | | | | | | | | |
| Time | Channel # | Channel # | Channel # | Channel # | Channel # | Channel # | Channel # | Channel # |
| 0 | 0.036146 | 0.022872 | 0.023335 | 0.023972 | 0.021242 | 0.023685 | 0.020126 | 0.019 |
| 0.09999 | 0.036146 | 0.022872 | 0.014273 | 0.023972 | 0.021242 | 0.032784 | 0.020126 | 0.028103 |
| 0.09999 | 0.036146 | 0.022875 | 0.014273 | 0.014882 | 0.021242 | 0.032784 | 0.020126 | 0.019 |
| 0.19998 | 0.036146 | 0.022872 | 0.023335 | 0.014882 | 0.021242 | 0.023685 | 0.020126 | 0.028103 |
| 0.19998 | 0.027062 | 0.013767 | 0.005168 | 0.014857 | 0.021219 | 0.014584 | 0.010996 | 0.018995 |
| 0.29997 | 0.036146 | 0.022872 | 0.014273 | 0.014882 | 0.021242 | 0.023685 | 0.020126 | 0.028103 |
| 0.29997 | 0.036146 | 0.022872 | 0.023335 | 0.014882 | 0.021242 | 0.023685 | 0.020126 | 0.028103 |

FIG. 23

SYSTEM FOR ACQUIRING AND ANALYZING A TWO-DIMENSIONAL ARRAY OF DATA

BACKGROUND OF THE INVENTION

1. Field of the Invention

The invention relates to data acquisition and analysis systems and, more particularly, to a system for real-time acquisition and analysis of a two-dimensional array of data regarding a phenomenon such as a plasma within a plasma generator including plasmas generated in semiconductor processing equipment, liquid crystal display fabrication equipment or other such equipment.

2. Description of the Background Art

In many types of substrate processing techniques, including etching, physical vapor deposition, liquid crystal display fabrication, chemical vapor deposition, and the like, the processing equipment utilizes a plasma during substrate processing. To optimize the process, the plasma must be maintained uniformly across the entire surface of the substrate being processed. To characterize a plasma and to determine particular parameters for establishing and maintaining the plasma, the plasma must be monitored in some manner while processing an actual substrate or a substrate facsimile. When the plasma is used in semiconductor wafer processing, the plasma is typically monitored while processing an actual wafer or a placebo wafer (also known as a dummy wafer).

One simple technique for monitoring the plasma uniformity within a semiconductor processing system requires placing an actual wafer in a reaction chamber of an etching system such as a model PE5000 manufactured by Applied Materials, Inc. of Santa Clara, Calif. The plasma initialization and maintenance parameters, e.g., gas pressure, source power, bias power, cathode temperature, and the like, are established and then the equipment strikes the plasma. The equipment is used in a manner that duplicates utilization of the plasma to process the wafer. After the processing is complete, the wafer is removed and physically inspected to determine the uniformity of the processing. For example, if an etch process was accomplished, the uniformity of the etch is measured using a laser interferometer. The resulting physical properties of the wafer are used to approximate the uniformity of the plasma. By repeating this technique for a number of wafers using various plasma parameters, the optimal parameter set can be determined which produces the optimal plasma uniformity. However, this plasma monitoring and evaluation technique is time consuming and costly.

Another technique used to monitor plasma uniformity is to attach one or more ion current probes to a placebo or dummy wafer, position the dummy wafer in the reaction chamber, and strike a plasma. A current meter measure the current generated by each of the ion current probes as a plasma is generated proximate the placebo wafer. The current measured represents the plasma density near the probes. As such, comparing the data from a number of probe locations generally represents the uniformity of the plasma. To compute uniformity, this technique requires substantial post acquisition processing of the data collected from the probes.

Therefore, there is a need in the art for a system for monitoring and evaluating a three-dimensional phenomenon such as a plasma such that a graphical representation of the phenomena is generated and displayed. Also, such display generation should be accomplished in real-time such that instantaneous analysis and optimization of the phenomenon control parameters can be accomplished.

SUMMARY OF THE INVENTION

The present invention overcomes the disadvantages of the prior art by acquiring and analyzing data, especially three-dimensional data, which represents a phenomenon, such as a plasma, and displaying that data in an intuitive graphical display, where the graphical display is controlled through a plurality of interface displays. Specifically, the present invention is a system for acquiring two-dimensional array of data representing a phenomenon (i.e., a two-dimensional data set having a data value for each of a plurality of locations proximate the phenomenon), processing that data and displaying the data, in real-time, in one of a number of user selectable graphical formats. The data, once acquired, can be further processed by editing, filtering and smoothing. Such processed data can then be "replayed" such that a user can compare various sets of data acquired under various test scenarios.

More specifically, the system of the present invention contains a sensor, a signal converter, an analog-to-digital converter (A/D converter) and a computer system. The sensor provides a measure of a characteristic of the phenomena such as intensity, temperature gradients, radiation distribution and the like in a two-dimensional data array. For a plasma, the sensor measures such characteristic ion current, ion energy, temperature, and the like. The signals produced by the sensor are processed by the signal converter to achieve a signal that can be easily digitized. Typically, such processing includes low pass filtration and signal amplification. The processed signals are digitized by the A/D converter. The computer system performs the data processing, display generation, and implements all user commands.

The data processing and display generation portions of the invention are illustratively implemented as a software program that is executed by the computer system. The software contains a main routine through which a user can select one of a plurality of tasks to be performed by the computer system. These tasks include initiating data acquisition (run experiment routine), data editing (data editing routine), data analysis (data analysis routine), electronics calibration (electronics calibration routine) and exporting data (export data routine). A user controls each of these routines through one of a plurality of graphical interface displays. The interface displays for data acquisition, editing, and analysis contain a graph region having a data graph in a user selected format, a test information region having text that defines the test for which data is being acquired, a control button region having various buttons, menus and fields, through which a user controls the graphical display of data, and a statistics display region depicting statistics regarding the presently displayed data. As such, the invention provides an intuitive, user controlled, real-time display of data within a two-dimensional array such that a user can easily grasp the nature of the phenomenon being monitored. Specifically, for a plasma, a user quickly ascertains the uniformity of the plasma within a reaction chamber or other plasma generator.

A further embodiment of the invention couples the computer system to a computer controlled plasma generator. The invention is then executed not only to display the data collected as the plasma is generated, but also to establish and control the various parameters that control the plasma. Such parameters include bias voltage, chamber pressure, reactive gas flow rate, RF power, and the like. Such a control system enables a user, through a single interface, to monitor and control the plasma generation process. Additionally, feedback algorithms can be implemented that maintain the plasma in accordance with user defined plasma operating constraints. Such algorithms can be further expanded into neural networks that "learn" the optimal manner for adjusting the test parameters to optimize the plasma in response to changes in the measured plasma characteristics. Such optimization is substantially free of user intervention.

BRIEF DESCRIPTION OF THE DRAWINGS

The teachings of the present invention can be readily understood by considering the following detailed description in conjunction with the accompanying drawings, in which:

FIG. 6 depicts an interface display for entering header and file identification information;

FIG. 23 depicts an ASCII representation of a data file as exported by the invention.

To facilitate understanding, identical reference numerals have been used, where possible, to designate identical elements that are common to the figures.

DETAILED DESCRIPTION

The present invention is a system for performing real-time, data acquisition, analysis and display. The system is useful in monitoring and evaluating a plasma produced within plasma generation equipment such as a semiconductor processing system, liquid crystal display fabrication equipment or any other type of equipment wherein a plasma is produced. The invention also finds use in monitoring and evaluating temperature gradients within ovens or furnaces, radiation distribution in microwave ovens, and other radiation generators, and in general, the invention can be used in any application where a two-dimensional array of data (two-dimensional data set) needs to be analyzed and displayed in real-time.

Specifically, the invention operates in cooperation with various types of phenomenon monitoring probes. For example, the probe apparatus for measuring characteristics of a plasma is typically a two-dimensional array of current probes or energy probes that provide a measure of plasma density at discrete locations within the equipment. In a semiconductor processing system, each discrete location is typically a point upon a placebo or dummy wafer positioned upon a wafer pedestal within the reaction chamber. The system of the present invention processes and analyzes the two-dimensional array of data collected by the probe(s) to generate various graphical data display formats including a plasma intensity graph, a three-dimensional bar graph, a three-dimensional surface graph and a cross-sectional view of the three-dimensional surface graph. These graphs represent the plasma intensity and uniformity in an intuitive, graphical manner. As such, a user can quickly and easily visualize the plasma uniformity. The system generates these displays in real-time such that a user can instantly adjust the parameters controlling the plasma to optimize the uniformity of the plasma. Thus, in a short time, the user can set up an experiment, strike the plasma, and optimize the plasma for processing wafers or other substrates.

Figure 1:
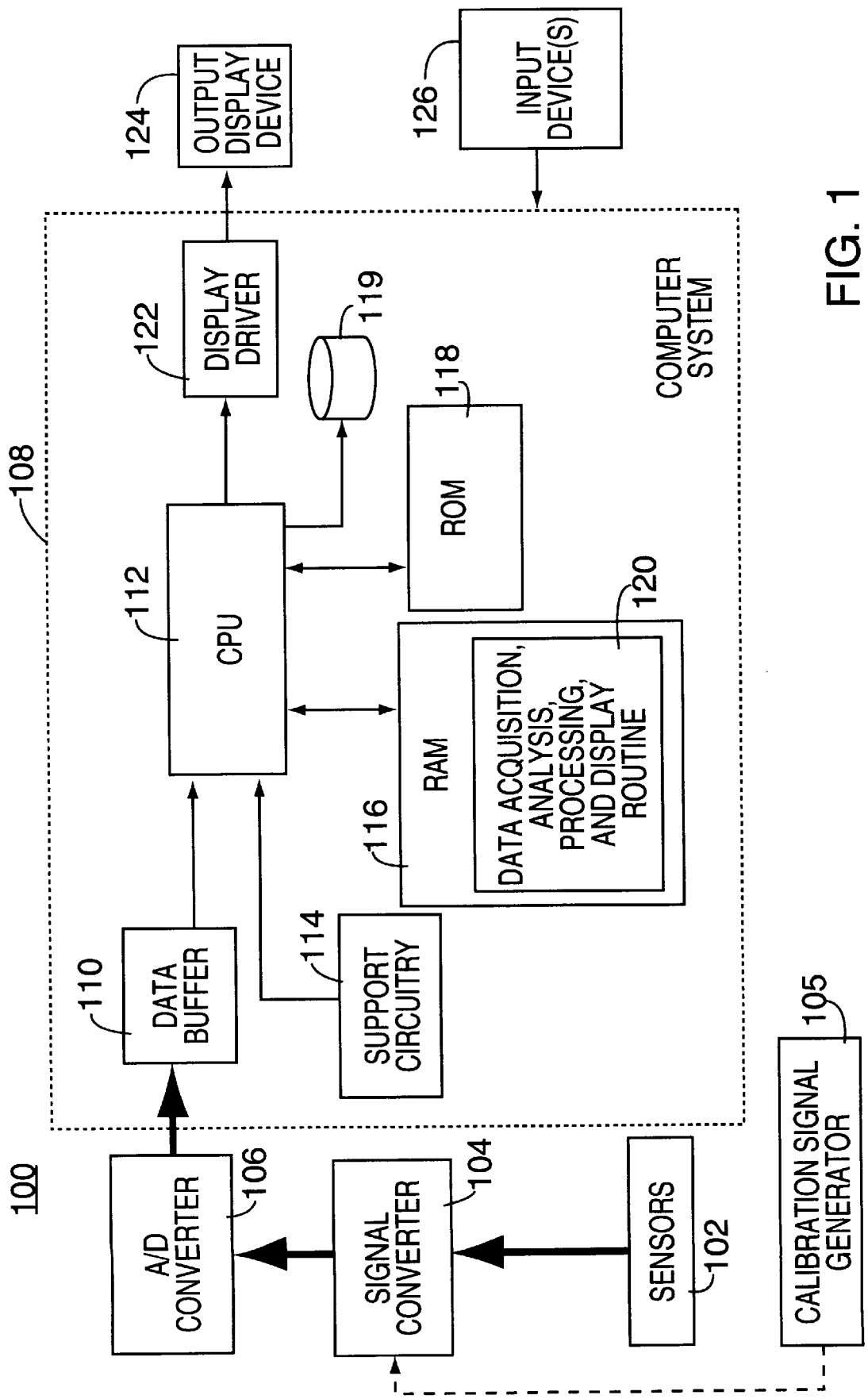
FIG. 1 depicts a block diagram of a system for data acquisition and analysis in accordance with the present invention.

Specifically, FIG. 1 depicts a block diagram of the system 100 of the present invention. The system contains a sensor 102 or sensors for real-time monitoring of a phenomenon such as a plasma, a signal converter 104, a calibration signal generator 105, an analog-to-digital (A/D) converter 106, a general purpose computer system 108, one or more input devices 126 and an output display device 124. The sensors 102 provide two-dimensional array of analog data representing, for example, plasma intensity within plasma generation equipment (not shown). The analog data is preconditioned by the signal converter 104. The calibration signal generator 105 is used during calibration of the electronics which is discussed below with reference to FIGS. 19 and 20. The A/D converter 106 digitizes the preconditioned analog signal and sends it to the computer system 108. The computer system is programmed to process the data and produce user selected graphical displays of the data on the display device 124.

The sensors 102 can be any one, or a combination of, the available monitoring sensors that are available in the art. The type of sensor array used depends upon the application for the system, e.g., measuring plasma intensity, temperature gradient, radiation distribution and the like. For example, the sensors for measuring plasma intensity can be one or more of the following taken singly or in any combination: a current probe, an energy analyzer, an optical sensor, a voltage probe, a temperature sensor, and the like. These sensors are typically arranged in a two-dimensional array upon a placebo or dummy wafer. Alternatively, the sensors can be attached directly to the wafer pedestal within the reaction chamber that contains the plasma or attached to other portions of the reaction chamber such as the chamber walls. Illustrative sensor arrays that can be used with the system of the present invention are disclosed in commonly assigned U.S. Pat. No. 5,451,784 issued Sep. 19, 1995, U.S. patent application Ser. No. 08/409,389 filed Mar. 23, 1995 and U.S. patent application Ser. No. 08/570,184 filed Dec. 11, 1995. The disclosures of the aforementioned patent and patent applications are herein incorporated by reference.

Other applications of the invention would require alternative sensor arrays. For example, in a furnace or oven, thermocouples or pyrometers are used to provide a two-dimensional array of data representing temperature within the oven. The data is processed to provide a temperature gradient profile. As a further example, in a microwave oven or antenna test chamber, radiation sensors (e.g., dipoles) are positioned in an array within the chamber or oven to provide data representing radiation distribution. The data is processed by the invention to provide an intuitive representation of the radiation distribution.

To simplify the remainder of this disclosure, the invention is discussed as used to monitor and evaluate a plasma within a plasma generator and, in particular, within a semiconductor wafer processing system. Consequently, the sensors will be assumed to be the two-dimensional ion current probe array disclosed in U.S. patent application Ser. No. 08/570, 184 filed Dec. 11, 1995.

The signal converter 104 conditions the signals generated by the sensors. Specifically, the converter provides a voltage divider and/or amplifier that ensures that the sensor signals are generally within the input dynamic range of the A/D converter 106. Additionally, the signal converter may provide noise reduction filtering, selective frequency band filtering, signal pre-emphasis or de-emphasis, and other forms of signal processing. An illustrative signal conditioner is discussed below with respect to FIG. 2.

The A/D converter 106 is connected to the signal converter 104 and digitizes the signals produced by the signal converter. Specifically, the signal converter produces one signal waveform for each sensor. As such, a multi-channel A/D converter is used to simultaneously digitize each of the waveforms. One illustrative multi-channel A/D converter is the model DAQCard 700 manufactured by National Instruments. This particular A/D converter simultaneously digitizes twenty waveforms using 16 bits to form a two-dimensional array of data (a three-dimensional data set).

The general purpose computer 108 facilitates data acquisition, analysis, processing, and display. Specifically, the computer system contains a data buffer 110, a central processing unit (CPU) 112, support circuitry 114, random access memory (RAM) 116, read only memory (ROM) 118, mass storage device 119 (e.g., a disk drive), and a display driver 122. Additionally, a user interacts with the computer system through one or more input devices 126 such as a keyboard, mouse, trackball, touchpad, and the like. Also, the computer systems displays the data and various graphical interface displays (screens) on an output display device 124 such as a computer monitor. Alternatively, the computer system may also interact with other output display devices such as a printer to provide a "hard copy" of any display that appears on the computer monitor.

The data buffer 110 provides data rate equalization between the A/D converter and the CPU. Typically, this buffer is a first-in, first-out (FIFO) buffer. Such buffers are typically used to provide a constant data rate to the CPU while providing flexibility in the data rates that can be generated by a data source such as the A/D converter.

The CPU 112 is typically a general purpose processor such as a PowerPC, Pentium, or some other generally available processor. PowerPC is a registered trademark of International Business Machines of Armonk, N.Y. and Pentium is a registered trademark of Intel Corporation of Santa Clara, Calif. Since the software implementation of the present invention is not required to execute on any specific processor, the routines of the present invention can be executed upon any type of processor or combination of processors in a parallel processing computer environment. The present embodiment of the invention as described herein executes on a Pentium processor that is manufactured by Intel Corporation of Santa Clara, Calif.

The CPU 112 operates in conjunction with various other circuits such as RAM 116, ROM 118 and support circuitry 114 such as co-processor(s), clock circuits, cache, power supplies and other well-known circuits. The operation and interrelationship of these various computer components is well-known in the art and does not require further explanation. The display driver 122 may be a video card, printer driver or other common driver software or hardware as required by the output device(s) 124.

The RAM 116 stores the software portion of the present invention. Typically, the routines of the invention are stored in a mass storage device 119 and recalled for temporary storage in the RAM 116 when executed by the CPU 112. The invention is implemented as a combination of software routines of which the main routine is the data acquisition, analysis, processing, and display routine 120. These routines are generally written using object-oriented programming as is further discussed below.

Figure 2:
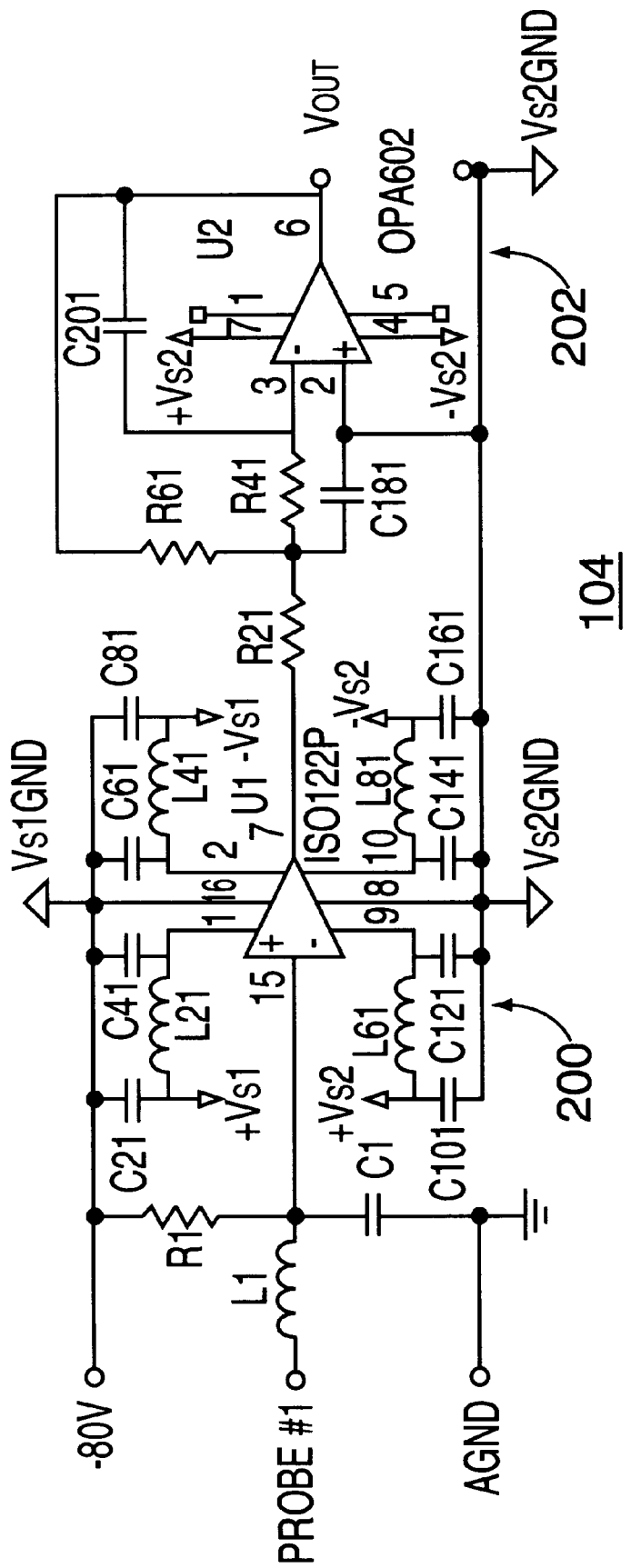
FIG. 2 depicts a detailed schematic of the signal converter of FIG. 1.

FIG. 2 is a detailed schematic of an embodiment of the signal converter 104 as used with a sensor array comprising a two-dimensional array of ion current probes.

Specifically, this embodiment contains a current-to-voltage converter 200 connected in series with an amplifier 202. There is one of these active circuits for each probe in the sensor array, e.g., twenty circuits connected to twenty probes. This active circuit implementation provides fully isolated signal paths from each probe to each A/D converter channel.

Specifically, the probe is biased with −80 volts through resistor R1 (approximately 5.6 kΩ) and inductor L1 (approximately 56 $\mu$H). The inductor L1 is further connected through capacitor C1 to form a low pass filter. The junction point of L1, R1 and C1 is connected to the input port of the current-to-voltage converter 200. Each power supply input (e.g., $+V_{s1}$) is filtered with a pi-type low pass filter consisting of two capacitors bridged by an inductor (e.g., C21, C41 and L21) prior to connection to a power supply pin (e.g., pin 1). The converter 200 is a single integrated circuit U1, model ISO122P, having pins 1, 2, 9 and 10 connected to appropriate power supply voltages, pins 8 and 16 connected to ground, pin 15 as an input port and pin 7 as an output port. The converter U1 converts a current generated by the probe into a voltage level having a magnitude representing the amount of current supplied by the probe.

The voltage generated at pin 7 of converter U1 forms an input to an operational amplifier U2, model OPA602, which amplifies the voltage level to a magnitude that is useful to the A/D converter. The input signal to the operational amplifier passes through two series connected resistors R21 and R41 (respectively approximately 13 kΩ and 385Ω) to the negative input port of the amplifier integrated circuit. The connection point of R21 and R41 is coupled to the positive input port of the operational amplifier through capacitor C181 (approximately 4700 pF). The connection point of R21 and R41 is also coupled to the output port of the amplifier by resistor R61 (approximately 1 MΩ). Also the negative input port is coupled to the output port through capacitor C201 (approximately 100 pF). Power is connected to pins 4 and 7 and ground is connected to pins 1 and 5. The output of the signal converter 104 is a low pass filtered and amplified voltage signal that is amplified to a level which is efficiently digitized by the A/D converter discussed above.

Next, the software that is executed by the CPU to facilitate real-time data acquisition, analysis, processing, and display is discussed in detail. In the present implementation, the software was written using an object-oriented program development application that facilitates graphical program generation. The application used is LabVIEW, a product of National Instruments of Austin, Tex. LabVIEW is a general purpose programming system having extensive libraries of functions that are represented by graphical icons. By interconnecting the icons with signal flow paths, a user can generate a fully functional graphical interface that facilitates data processing and data display. Once the graphical program is developed, it can be executed by the CPU just as any other program. Each icon in the program listing executes a subroutine (object) that performs the function represented by the icon.

Although the software implementation of the invention has been developed using a particular object-oriented development application, the invention can be practiced using other object-oriented applications, using a text-based programming language such as C, basic, and the like, or developed as a hardware system having a physical interface rather than a graphical interface.

The following description of the software contains details pertaining to the most important and novel features of the present invention. Various well-known support algorithms such as error handling, peripheral drivers and the like are not discussed.

Figure 3:
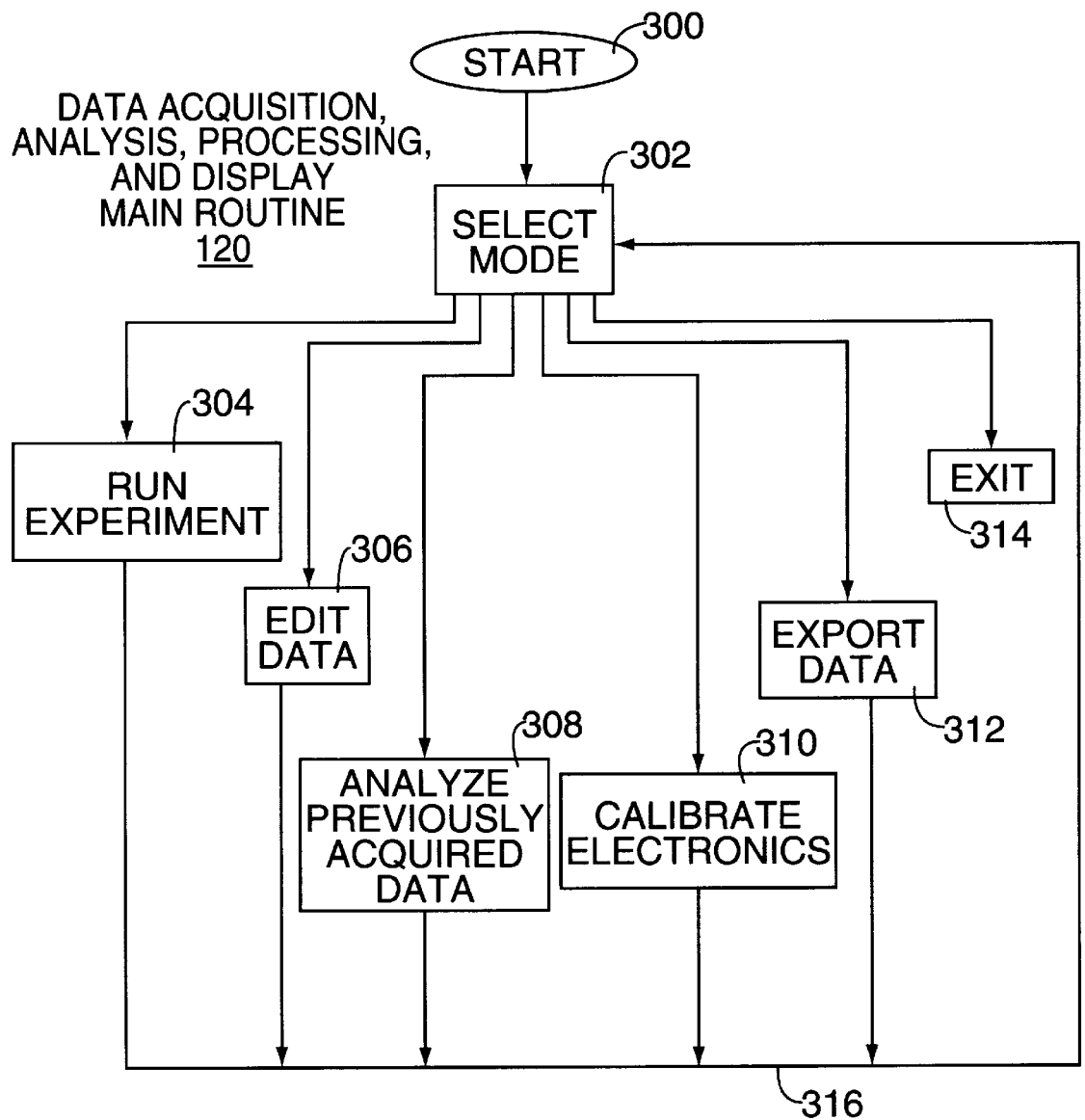
FIG. 3 depicts a high-level flow diagram of the data acquisition, analysis, processing, and display main routine.

FIG. 3 depicts a high level flow diagram of the data acquisition, processing, and display main routine 120 that is executed by the computer system. The routine begins at step 300 and proceeds to step 302. At step 302, the routine selects a mode of operation typically in response to input from a user interface display 400 such as that shown in FIG. 4. To best understand the operation of the main routine, the reader should simultaneously refer to FIGS. 3 and 4.

Once routine 120 is executed, a user must select a mode of operation for the system of the present invention. The selected mode then executes one of the subroutines that fulfills the desired operation. These subroutines include: run experiment routine 304 (FIG. 6), edit data routine 306 (FIG. 14), analyze previously acquired data routine 308 (FIG. 18), calibrate electronics routine 310 (FIG. 20), export data routine 312 (FIG. 22), and exit the main routine (step 314). Each of these routines accomplishes a particular function that are each discussed in detail below.

To execute a particular function, the user merely points a mouse pointer at a selected "button" in display 400 and "clicks" the mouse. The CPU then executes a subroutine to accomplish the selected function. Specifically, button 402 executes the run experiment routine 304, button 404 executes the edit data routine 306, button 406 executes the analyze previously acquired data routine 308, button 408 executes the electronics calibration routine 310, button 410 executes the export data routine 312 and button 412 exits the main routine. Alternatively, the buttons of interface display 400 could be replaced with a pull down menu, a label entry field, a physical push-button, or some other interface that permits the user to select a mode of operation for the system.

Each of the routines that execute from the main routine are discussed separately below.

A. Run Experiment Routine 404

Figure 5:
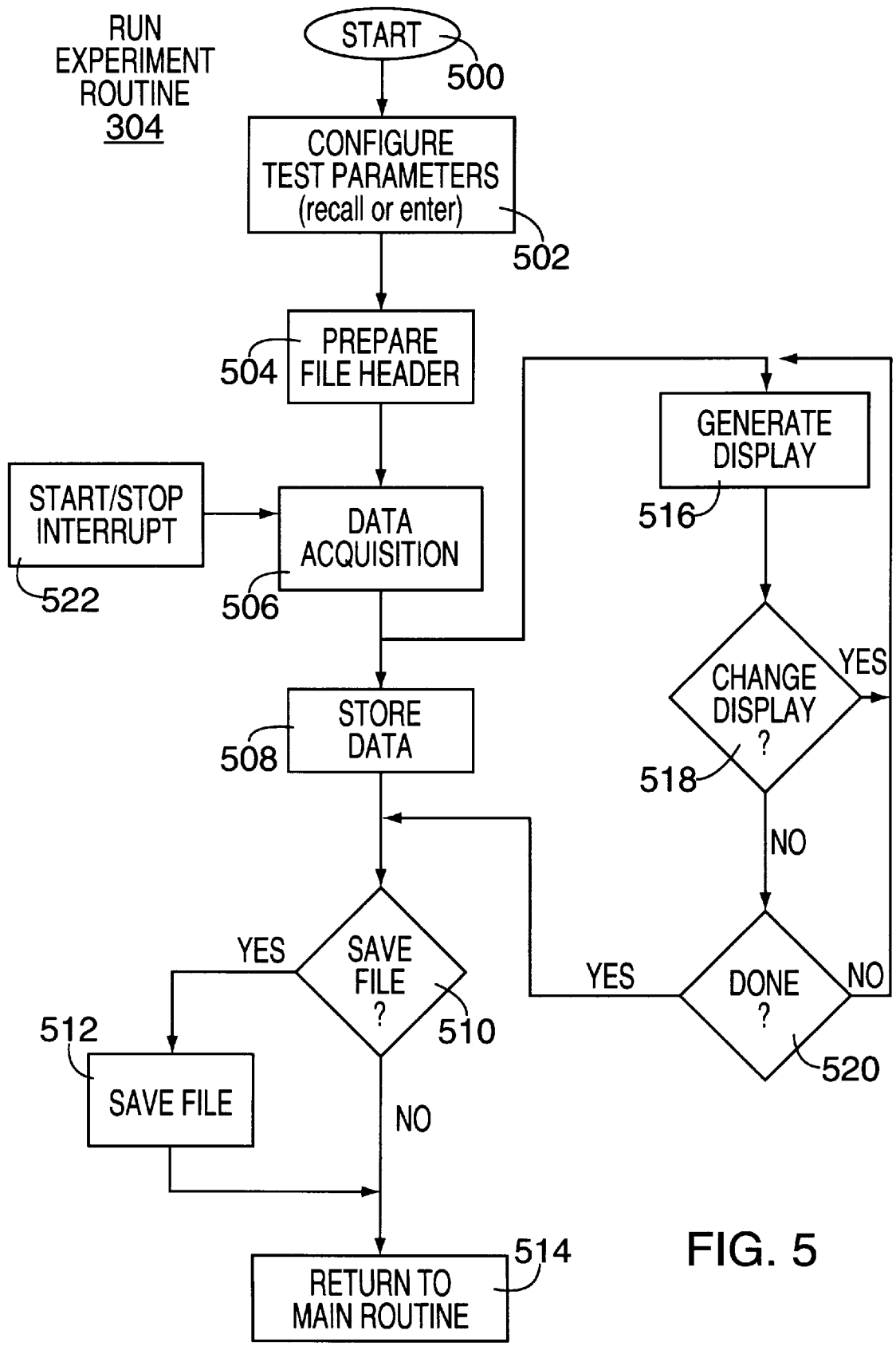
FIG. 5 depicts the run experiment routine that is optionally initiated from the main routine of FIG. 3.

FIG. 5 depicts a flow diagram of the run experiment routine 304. This routine begins at step 500 and proceeds to step 502 wherein the test parameters are configured either by recalling a parameter set from memory or entering the parameters from the keyboard. The test parameters include date, time, sampling frequency, source power, bias power, DC bias voltage, probe bias voltage, reaction chamber pressure, cathode temperature, reaction chamber wall temperature, and the like. At step 504, the routine prepares the file header. The file header contains various ones of the parameters to uniquely identify the file that will contain the data that will be accumulated during the test.

Figure 4:
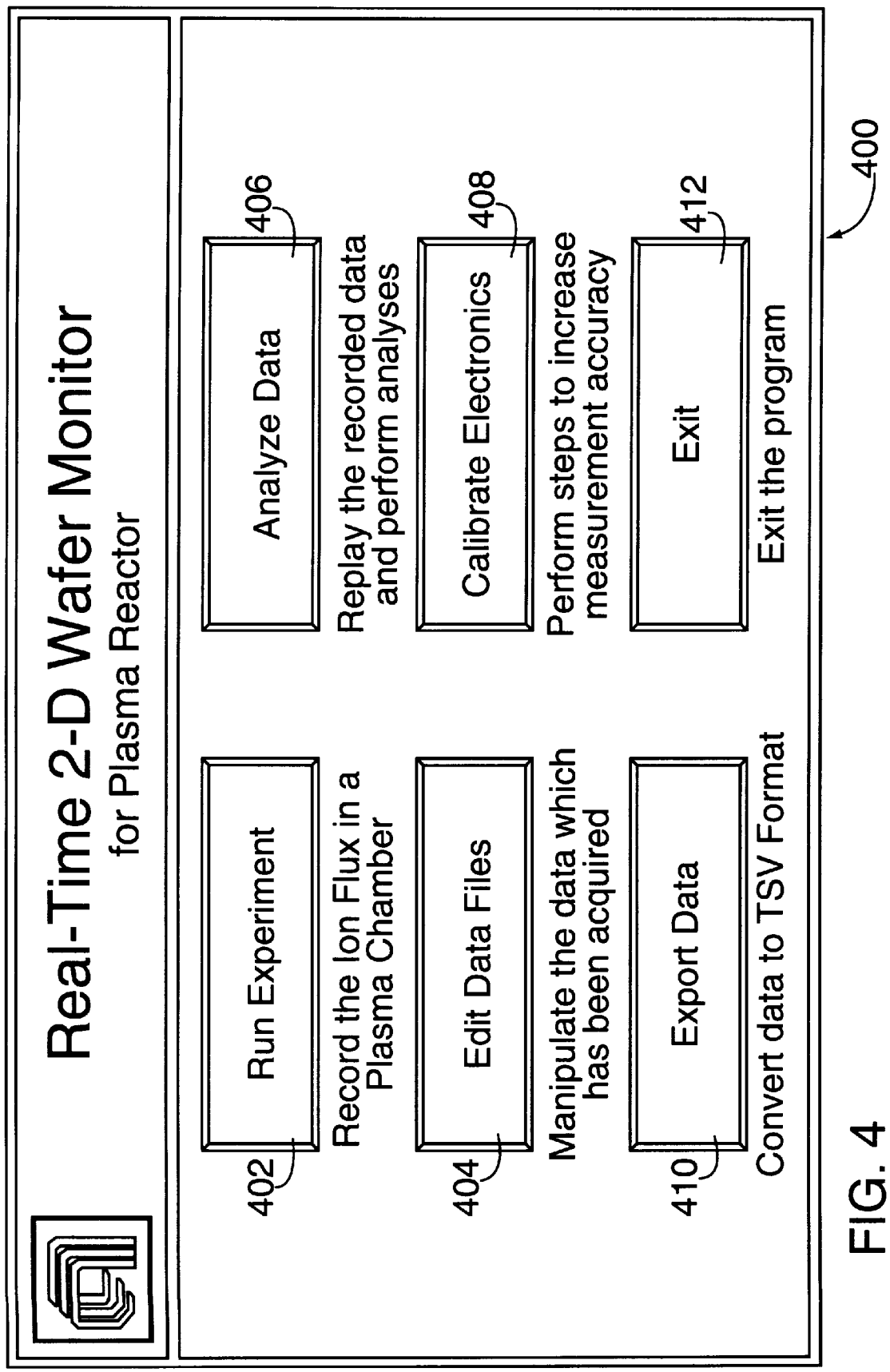
FIG. 4 depicts an illustrative user interface for controlling the system of FIG. 1.
Figure 6:
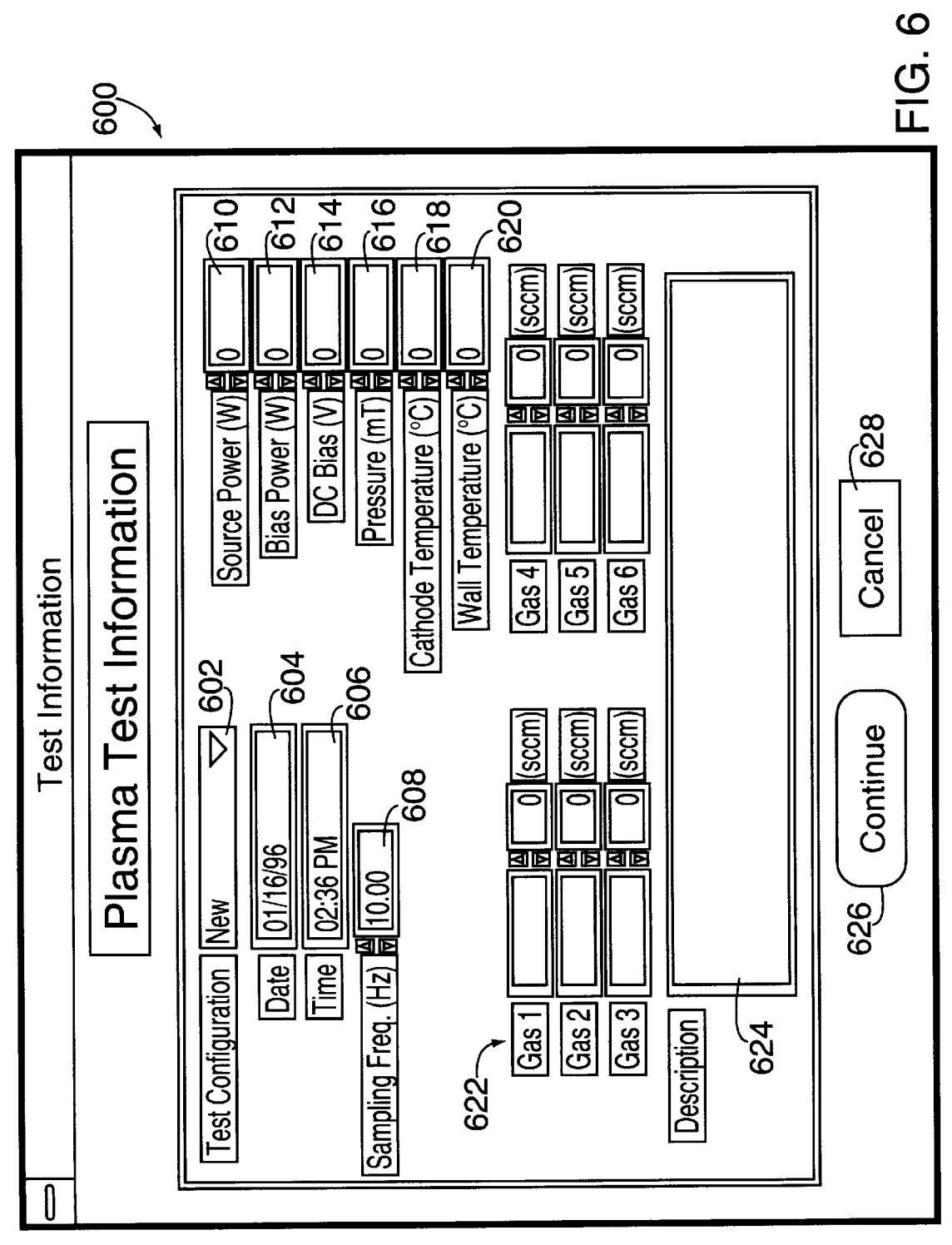

FIG. 6 depicts an illustrative interface display 600 for entering the header and test parameter information. Typically, a user types the information into the various fields. Specifically, the test identification fields include date field 604 and time field 606. The "Test Configuration" pull-down menu 602 permits the user to select previously entered test information by selecting the OPEN command within the pull-down menu 602 and entering or selecting a pre-existing file name. The sampling frequency that will be used to sample the probe data during the test is entered into field 608. Other test parameter fields that are entered include: source power field 610, bias power field 612, DC bias field 614, pressure field 616, cathode temperature field 618, wall temperature 620, and six different gas flow fields 622. The gas flow fields enable the user to identify the gases that are to be used in the test and the flow rate of those gases into the reaction chamber. Also, the user may enter a test description into the description field. If the user does not wish to complete the test information entry process, the CANCEL button 628 can be selected and the routine returns to the main screen (FIG. 4). On the other hand, once all the information is entered, the user can select the CONTINUE button 626 to proceed with data acquisition.

It should be noted that some of the information contained in display 600 can be automatically entered without user intervention. If desired, the user can then amend these automatically entered parameters. For example, the date and time are automatically entered from the computer system internal clock. Furthermore, some of the test parameters are measurable quantities (e.g., voltage and power levels, temperatures, pressures and the like) that can be captured by sensors on the test equipment. Lastly, this information panel can also double as a test control panel, where the values entered into the fields are coupled to the test equipment to set the parameters of the equipment. A detailed description of this alternative embodiment of the invention appears with respect to FIG. 24 below.

Returning to step 506 of FIG. 5, the run experiment routine 304 begins collecting data from the plasma generator, e.g., the probes are biased, the plasma is struck, and the ion current is digitized. As the data enters the computer, routine 304 accomplishes two functions. First the data is temporarily stored in RAM and, second, the data values are displayed, in real-time, to the user. Once the experiment is complete, the routine queries, at step 510, whether the user wants to save the data from the test as a file. If the user desires to save the data, the routine proceeds to step 512 where the data is saved in a file and stored under a user selected file name. Once saved or, if the user does not wish to save the data, the routine 304 returns, at step 514, to the main routine.

Steps 516, 518, and 520 provide a method for generating a plurality of graphical displays of the data as it is acquired in step 506. The data is initially displayed in a default display format such as a two-dimensional intensity graph (discussed below with respect to FIG. 9). However, at step 518, the user may select another display format from a pull-down menu. Other display formats include a three-dimensional bar graph, a three-dimensional surface graph, a cross-sectional view of the three-dimensional surface graph. If the user changes the display format, the format is changed in real-time and data continues to be displayed in the new format. When the test is complete, the query at step 520 is affirmatively answered and the routine proceeds to query whether the user wants to save the data (step 510). If the test is not complete, the user may continue viewing the data as it is acquired and temporarily stored in RAM.

B. Display Generation Routine 700

Figure 7:
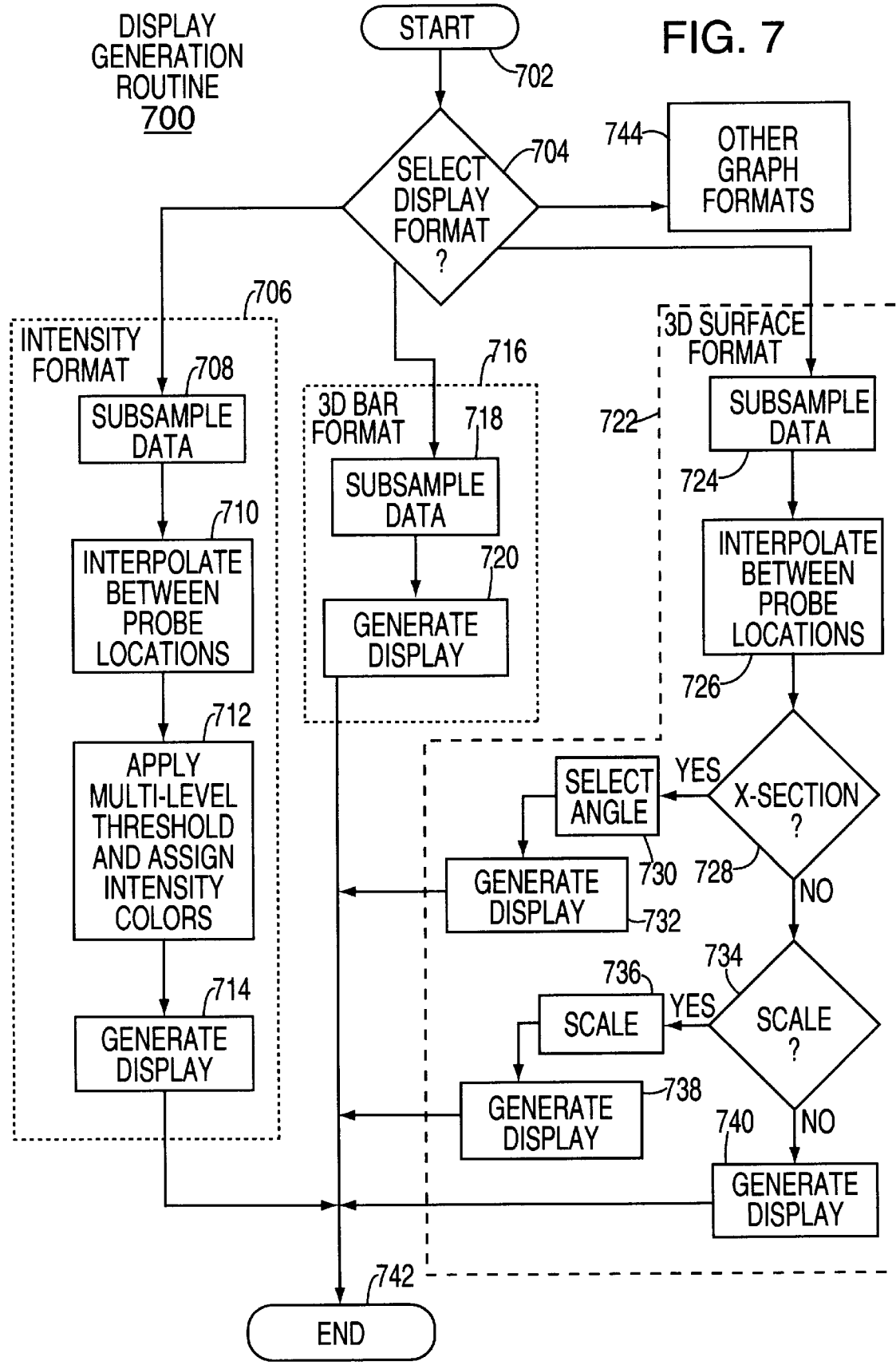
FIG. 7 depicts a display generation routine for generating a selectable display for the data collected by the system of FIG. 1.
Figure 8:
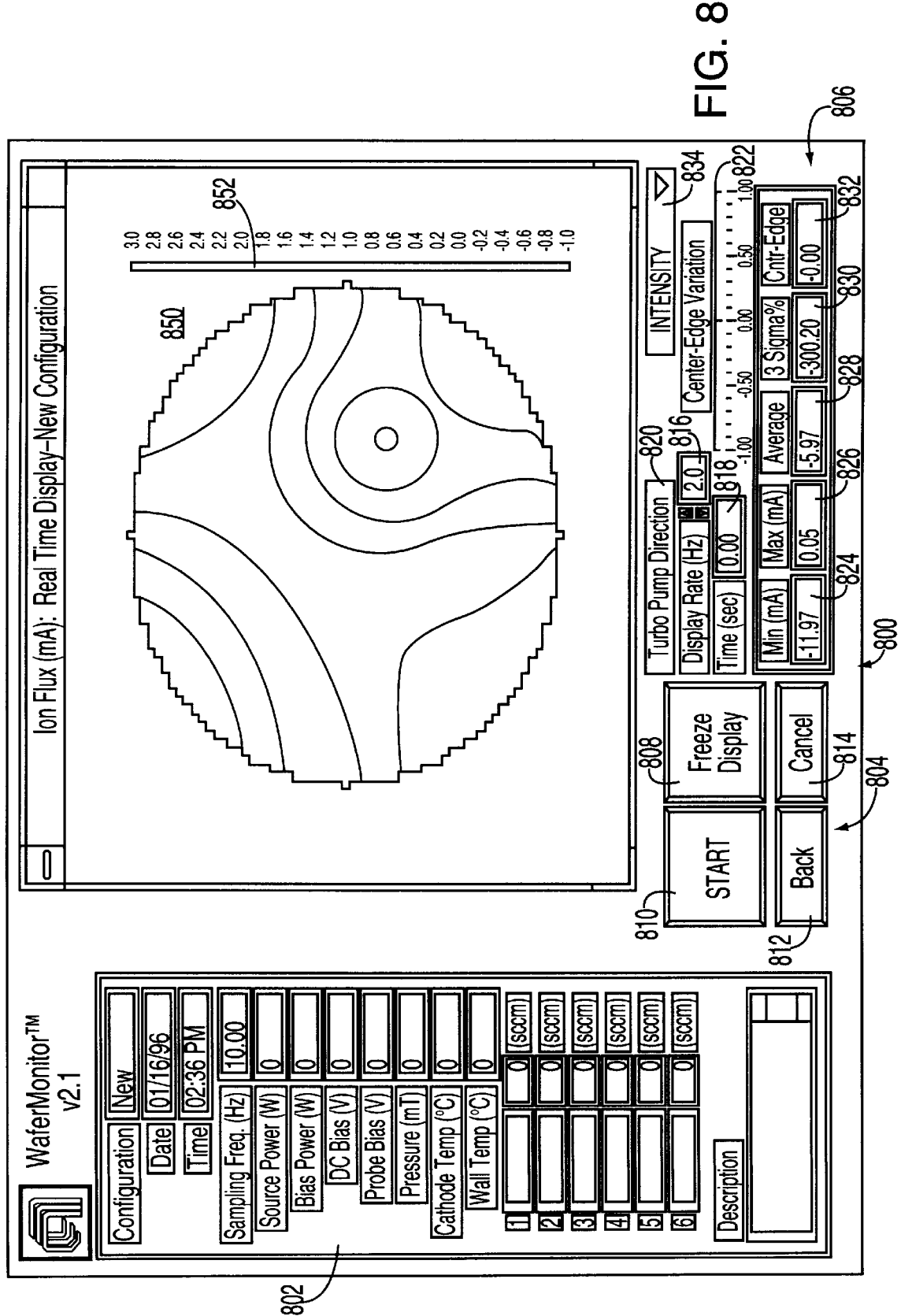
FIG. 8 depicts an interface display containing an illustrative intensity graph.
Figure 9:
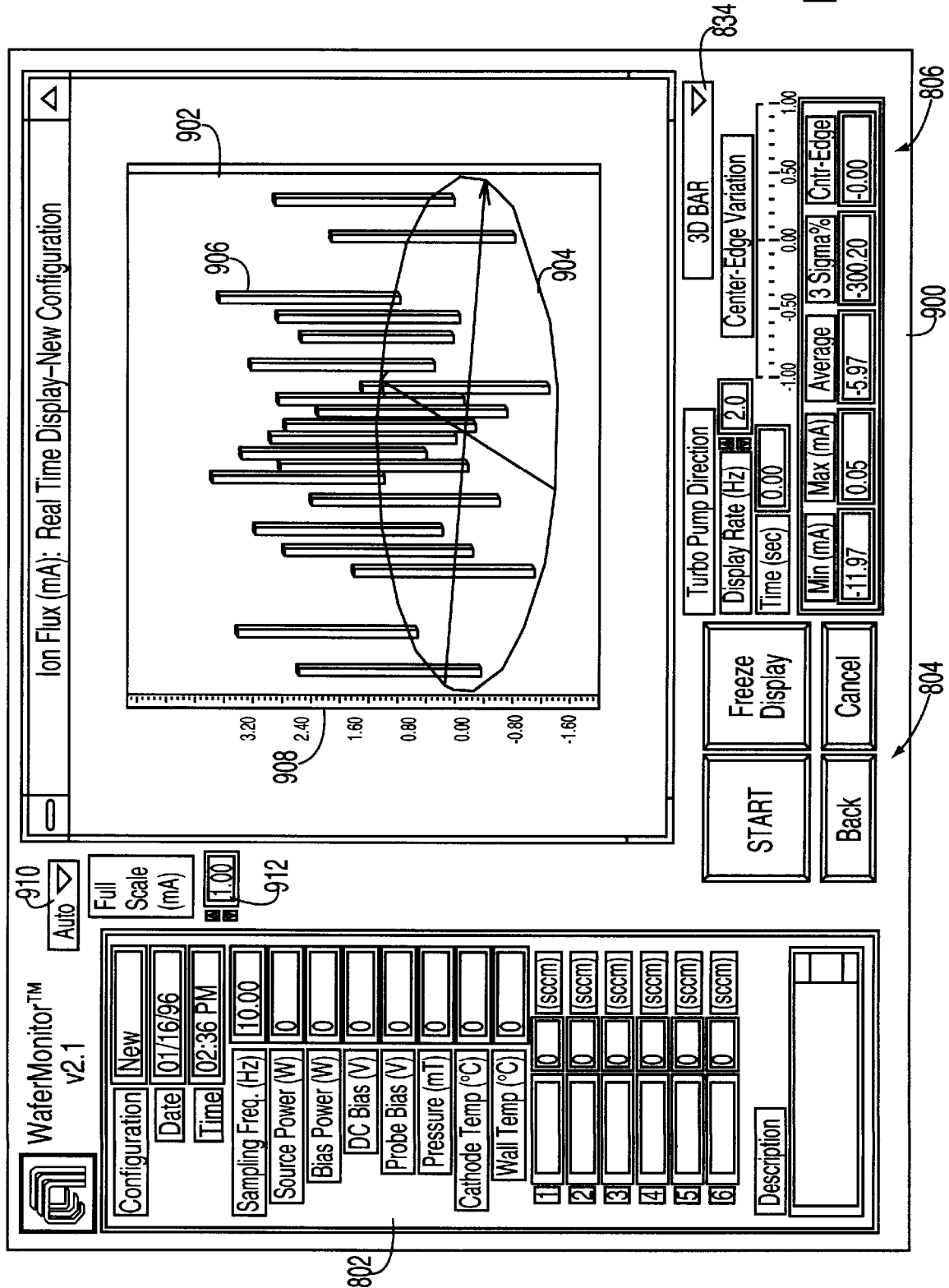
FIG. 9 depicts an interface display containing an illustrative three-dimensional bar graph.
Figure 10:
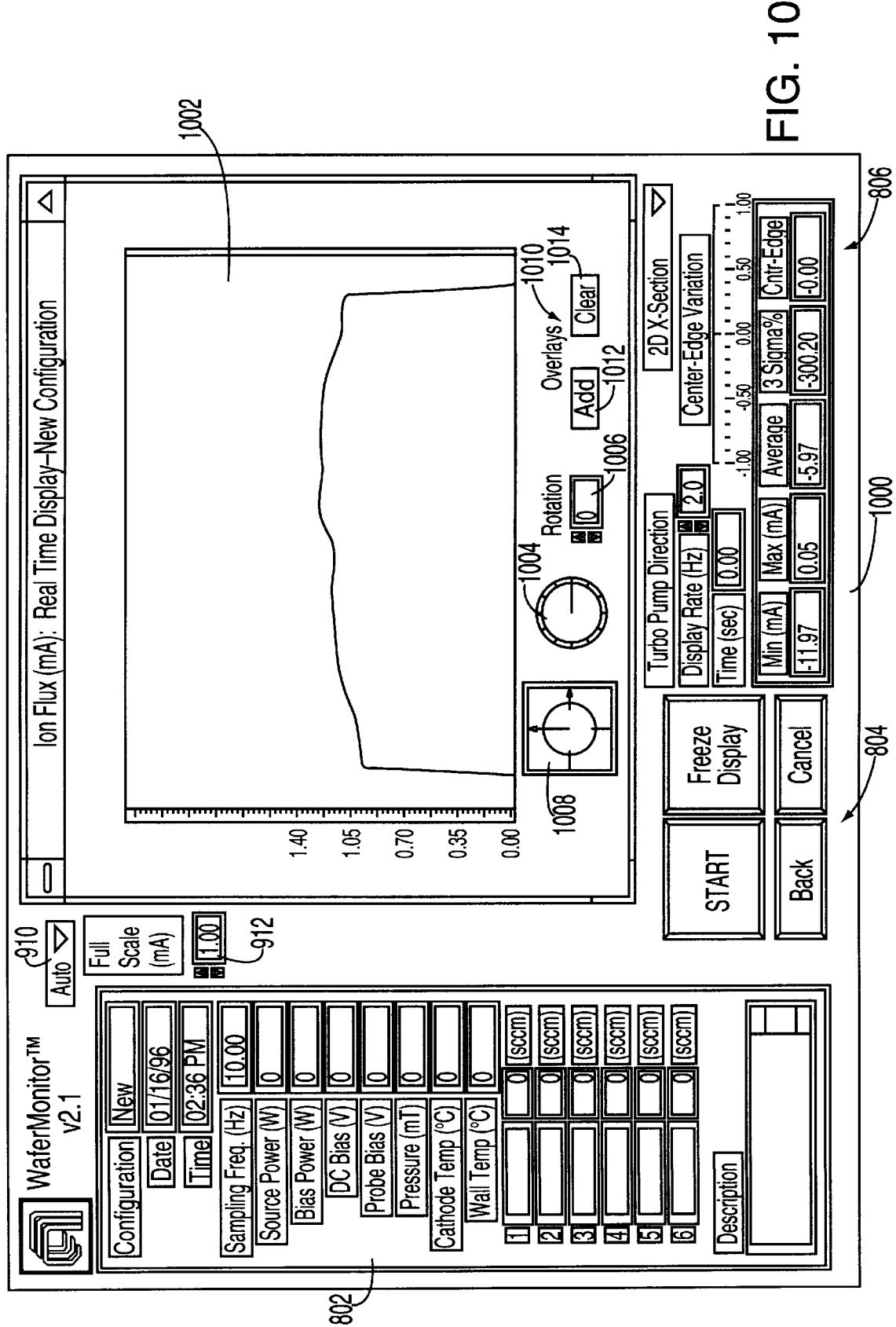
FIG. 10 depicts an interface display containing an illustrative two-dimensional cross section graph.
Figure 11:
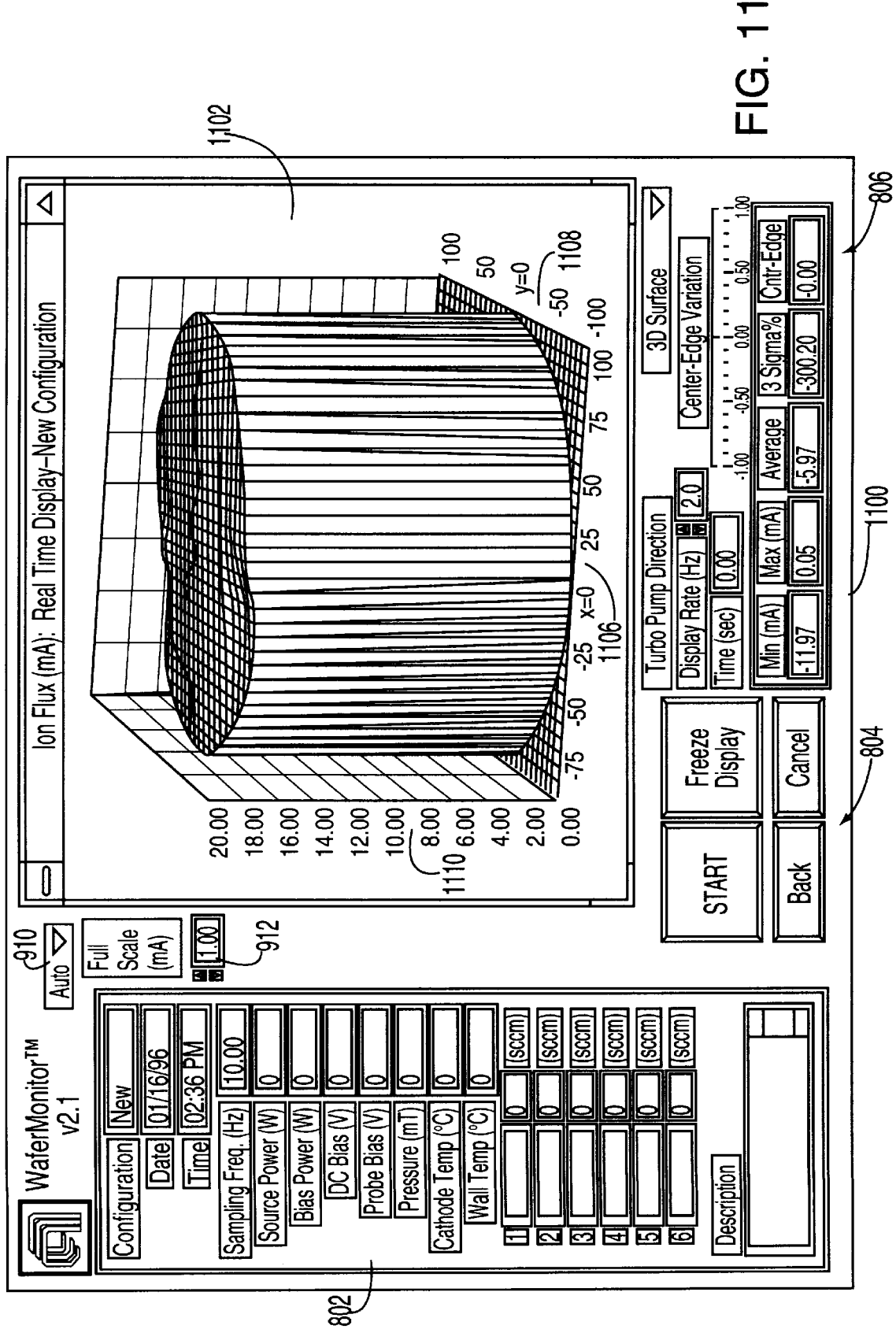
FIG. 11 depicts an interface display containing an illustrative three-dimensional surface graph.
Figure 12:
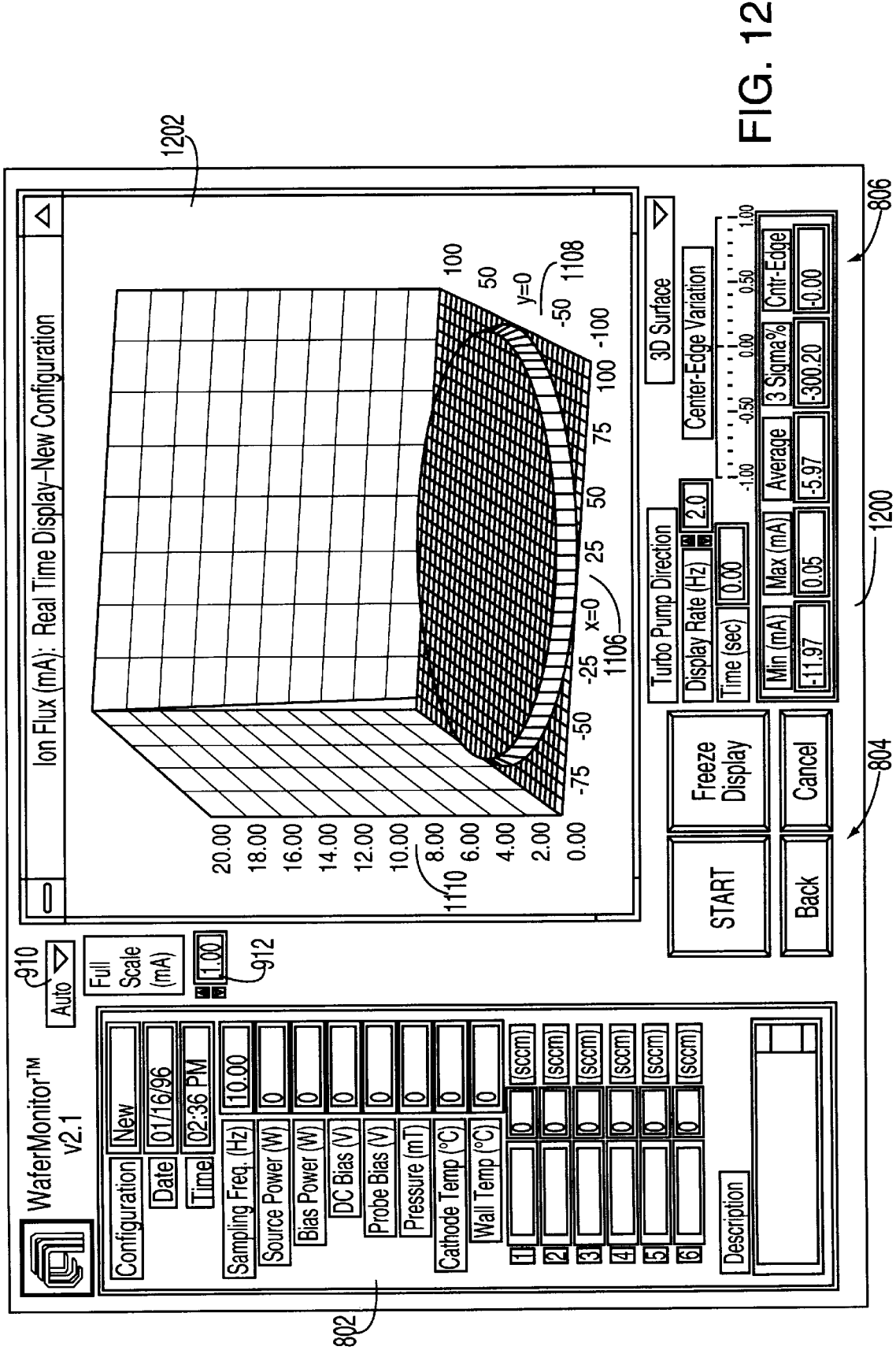
FIG. 12 depicts an interface display containing an illustrative scaled three-dimensional surface graph.

FIG. 7 depicts a flow diagram of a routine 700 for selectively producing a plurality of graphical display formats of the data acquired during the run experiment routine. This display generation routine is also used whenever data is displayed by the system, e.g., the edit data routine, the analyze data routine, and the like. As an illustration of the display formats that are available, FIG. 8 depicts an interface display 800 containing an illustrative intensity graph 850, FIG. 9 depicts an interface display 900 containing an illustrative three-dimensional bar graph 902, FIG. 10 depicts an interface display 1000 containing a cross-sectional view of a three-dimensional surface graph, FIG. 11 depicts an interface display 1100 containing a three-dimensional surface graph 1102 and FIG. 12 depicts an interface display 1200 containing a scaled three-dimensional surface graph 1202. Each interface display in FIGS. 8–12 controls the run experiment routine. As shall be discussed below, the interface displays for other routines vary from these particular interface displays, but the graphical representations of the data is the same as depicted in these figures. To best understand the operation of display generation routine 700, the reader should simultaneously refer to the illustrative display formats of FIGS. 8–11 and the flow diagram of FIG. 7.

The display generation routine 700 begins at step 702 and proceeds to query block 704. At step 704, a user selects a display format. Generally, one of the formats is a default format and the user either selects a format other than the default or maintains the default format. However, to generalize, the routine shows that the user may select any one of the display formats including: intensity graph 706, 3D bar graph 716, 3D surface graph 722 and its subformats: cross-sectional view of a 3D surface graph and a scaled 3D surface graph. Of course, other graph formats can be added to the routine. The formats are selected using a pull-down menu that is generally incorporated into each of the graphical interface displays.

FIG. 8 depicts a graphical interface display 800 including an illustrative intensity graph 850. The interface display (as used in conjunction with the run experiment routine) includes, along with the graph, a test parameters display area 802, a display control buttons area 804, and a graph statistics display area 806. More specifically, the test parameters displayed are exactly those that were entered during the run experiment routine. The display control buttons area 804 generally contains buttons that control the content of the displayed graph. The buttons in the control button area 804 vary depending upon the routine that is generating the display. For example, the edit data routine (FIGS. 13–16) has buttons that control data filtering and editing, the analyze previously acquired data routine (FIGS. 17–18) has buttons that control data playback, and the run experiment routine (FIGS. 5–12) has buttons that control data acquisition and data display.

More specifically, the control button area for the run experiment routine contains a START button 810, a FREEZE DISPLAY button 808, a BACK button 812, and a CANCEL button 814. A PRINT button (not shown) appears in place of the BACK and CANCEL buttons when the FREEZE DISPLAY button has been selected. The START button is used to start and stop the data acquisition step of the run experiment routine. The FREEZE DISPLAY button halts the graph update process at the moment the FREEZE DISPLAY button 808 is selected. However, the data acquisition continues in the background. When the FREEZE button 808 is again selected, the displayed graph will jump to the present time index and display the present data. Also, the PRINT button is also displayed when the FREEZE button 808 has been selected. As such, the user may transfer the presently displayed (and frozen) display to a printer. The BACK button 812 recalls and displays the most recent, previously displayed window. The CANCEL button returns the currently executing routine (e.g., the run experiment routine) to the main routine. Other forms of the display control button area are used during execution of other routines. These routines and their associated display structures are disclosed below.

The display statistics area 806 contains the DISPLAY RATE field 816 which is a user selectable rate that establishes a subsampling rate for the data. Since the data is acquired at a relatively high data rate (e.g. 10 Hz), the computer, depending upon the processor, may have trouble processing and displaying data at this rate. As such, the user can select a slower data display rate (e.g., 2 Hz). As such, all the data is collected and stored, but only a subset of the data is processed for display in a selected graph format.

The statistics area also displays the TIME field 818 which indicates a time tag for experiment progression. The orientation of the graph is made relative to the position of the turbopump (marker 820) connected to the reaction chamber within which the plasma is contained. Of course, any orientation marker could be used, the turbopump is merely convenient for the type of chamber presently used with the system. The plasma intensity variation from center to edge is computed and graphically displayed in field 822 i.e., the rectangular block is portrayed on the scale at the variation point. This value is computed by subtracting the measured intensity from the center intensity and dividing that difference by the average intensity measured by all the probes in the array. Also, the minimum probe current is displayed in field 824, the maximum probe current is displayed in field 826, the average probe current is displayed in field 828, the 3-sigma percentage plasma intensity variation value is displayed in field 830 and the center-to-edge variation is numerically recited in field 832.

As for the intensity graph 850 itself, the graph occupies the majority of the display and is color coded to provide a user with an intuitive understanding of plasma intensity. A color code key 852 appears on the right side of the intensity graph 800. A typical color coding scheme has the lowest intensity depicted as white, as the intensity increases, the color changes from white to blue, green, yellow, orange, and, at the highest intensity, red. With such a color depiction of plasma intensity, a user can quickly understand the degree of non-uniformity in the plasma intensity.

Returning to FIG. 7, the intensity graph described above is generated by subroutine 706. The "raw" data is subsampled, at step 708 in accordance with the user selected display rate. At step 710, the subsampled data is then two-dimensionally interpolated between individual probe data values. The interpolation produces a smooth set of data values between the discrete probe locations such that the intensity of the plasma is estimated over the entire measurement area (e.g., over the entire dummy wafer). At step 712, a multi-level threshold is applied to each data point and depending upon the intensity (magnitude) of the data value, a specific color is assigned to that value. Lastly, at step 714, the two-dimensional display is generated depicting the various colored data points in a relatively smooth pattern.

If the user selects the three-dimensional bar graph field from the pull-down menu 734 that appears in the default interface display, the display generation routine executes the 3D bar graph routine 716. The selection of a different display format can be accomplished at anytime before, during, and after data processing. The 3D bar graph routine 716 subsamples, in step 718, the data at the defined subsampling rate. At step 720, the routine generates the 3D bar graph of the data where each probe location is represented by a rectangular bar having a height that represents the plasma intensity (ion current) measured by each probe. The interface display 900, as shown in FIG. 9, contains a bar graph 902 showing a perspective view of a sensor platform 904 (e.g., the dummy wafer) and a plurality of individual bars 906 that represent the plasma intensity measured by each probe. The left hand scale 908 indicates the current level measured by the probes. As is common with all the interface displays, the display 900 contains a test parameter area 802, a control button area 804 and a statistical area 806. The various buttons and fields shown in these areas have been described above with respect to FIG. 8.

The interface display also includes a graph scaling adjustment pull-down menu 910 that enables the user to select either auto scaling to fit the data to the graph or manual scaling. In manual scaling mode, the vertical scale of the graph is established by a number entered into the scaling field 912. As such, the surface deformations of the graph can be made more pronounced. Such adjustment can provide further insight into plasma intensity fluctuations.

Returning to FIG. 7, the user can select the 3D surface graph for display at anytime by using the pull-down menu 834. The 3D surface graph can have one of three forms that are generated by the 3D surface graph routine 722. The three surface graph formats include a three-dimensional perspective view of the plasma intensity, a cross sectional view of the plasma intensity, and a scaled three-dimensional perspective view. Each of these sub-formats of the 3D surface graph format are discussed below. Again, the particular graph sub-format is selected from the pull-down menu 834 in any interface display format.

The 3D surface graph routine 722 subsamples, at step 720, the data at the user defined rate. At step 726, the routine applies an interpolation algorithm to the data points produced by each probe. As such, the routine produces a relatively smooth surface representing the intensity of the plasma proximate the sensor array platform, e.g., the dummy wafer. At step 728, the routine queries whether the user has selected a cross-sectional view sub-format. If the query is affirmatively answered, the routine requests the user to enter a section angle, i.e., the angle relative to the pump location through which the section is to be cut.

The interface display contains a rotary button 1008 for selecting a particular cross-sectional angle. As such, the user can select any angle 0 to 360 degrees in one degree increments to section the 3D surface graph. At step 732, the routine generates the cross sectional view of the 3D surface as a two-dimensional graph. FIG. 10 depicts an interface display 1000 containing an illustrative cross-sectional 3D surface graph 1002 as well as the test parameter area 802, the control button area 804 and the statistical area 806. In addition, the interface display 1000 contains a rotary button 1004 for selecting the cross-section angle. The angle value shown in field 1006 represents the present cross-section angle used to produce the present graph. An overlay button area 1010 contains an ADD button 1012 and a CLEAR button 1014. Depressing the ADD button "freezes" the present display and generates a new display graph "overlaying" the frozen graph. The user may then select a new angle of display for the new or "active" graph. There is no limit to the number of overlays that can be added. The CLEAR button 1014 removes all but the active graph from the display area.

If the query at step 728 is negatively answered, the routine proceeds to step 734. At step 734, the routine queries whether the user has selected the scaled 3D surface graph sub-format. If the query is negatively answered, the routine generates, at step 740, the 3D surface graph. FIG. 11 depicts an interface display 1100 containing a 3D surface graph 1102 as well as a test parameter display area 802, a display control button area 804, and a statistics display area 806. The 3D surface graph 1102 contains an X-axis 1106, a Y-axis 1108, and an intensity magnitude vertical axis 1110. The X- and Y-axes indicate a position on the sensor platform relative to the center of the platform where X=0 and Y=0. The vertical height of the surface indicates the magnitude of the plasma intensity (i.e., the current magnitude).

If the query at step 734 is affirmatively answered, the routine scales, at step 736, the 3D surface graph of FIG. 11. Typically, scaling is accomplished by determining the average magnitude of all probe measurements and subtracting the average value from all the interpolated values. As such, the height of the surface graph has an average of zero. Of course, other scaling techniques could be used. The routine forms the scaled three-dimensional surface graph at step 738. FIG. 12 depicts an interface display 1200 containing a scaled three-dimensional surface graph 1202 as well as the test parameter display area, the display control button area 804 and the statistics display area 806. This graph 1202 has the same axes 1106, 1108, and 1110 as the three-dimensional surface graph.

Returning to FIG. 7, the display generation routine ends at step 742. All the graphs are produced using a data graphing tool known as SurfaceVIEW for LabVIEW 3 manufactured by National Instruments of Austin, Tex. This graphing tool integrates various graphing and data display functions into software that is developed using the Lab-VIEW development application. Such a graphing tool supplies the functions to generate any one of a number of data graph formats when given the appropriate data for a particular format.

C. Edit Data Routine 306

Figure 13:
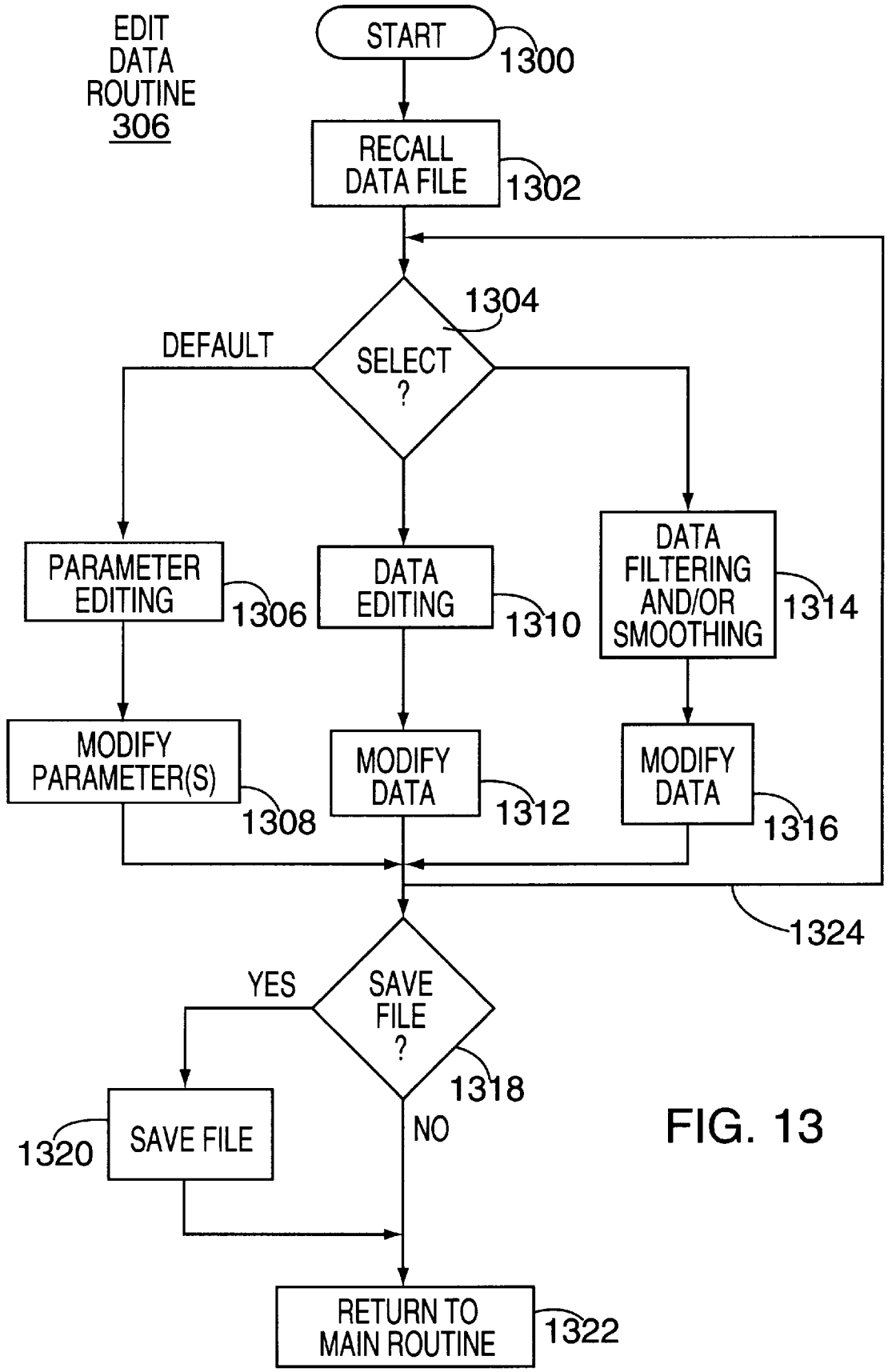
FIG. 13 depicts a flow diagram of an edit data routine that is optionally initiated from the main routine of FIG. 3.

FIG. 13 depicts the edit data routine 306 that is executed when a user selects the EDIT DATA button 404 of FIG. 4. The various interface displays that control operation of this routine are the parameter editing interface 400 of FIG. 14, the data editing interface 1500 of FIG. 15 and the data filtering/smoothing interface 1600 of FIG. 16. To best understand the operation of this routine, the reader should simultaneously refer to FIGS. 13, 14, 15, and 16.

The routine 306 begins at START block 1300 and proceeds to step 1302. At step 1302, the routine recalls a particular data file from memory for editing. This is typically accomplished by the user typing a file name into a particular field, by using a pull-down menu to select a particular file, or by using a file selection window. At step 1304, the user selects the type of information that is to be edited. For example, the user can edit the test parameter information (i.e., header information), the user could edit the actual test data on a point-by-point basis, or the user could edit the test data by applying a filtering or smoothing algorithm to all the data or some subset of the data. In either case, the user must select the particular information to edit. In the preferred embodiment, the routine generates a default interface display, e.g., a header information editing interface display 1400 of FIG. 14. From this interface display, a pull-down menu can be used to select any other form of data editing. Other means of selecting the information to edit could include pull-down menus, radio buttons, selection windows and the like.

Figure 14:
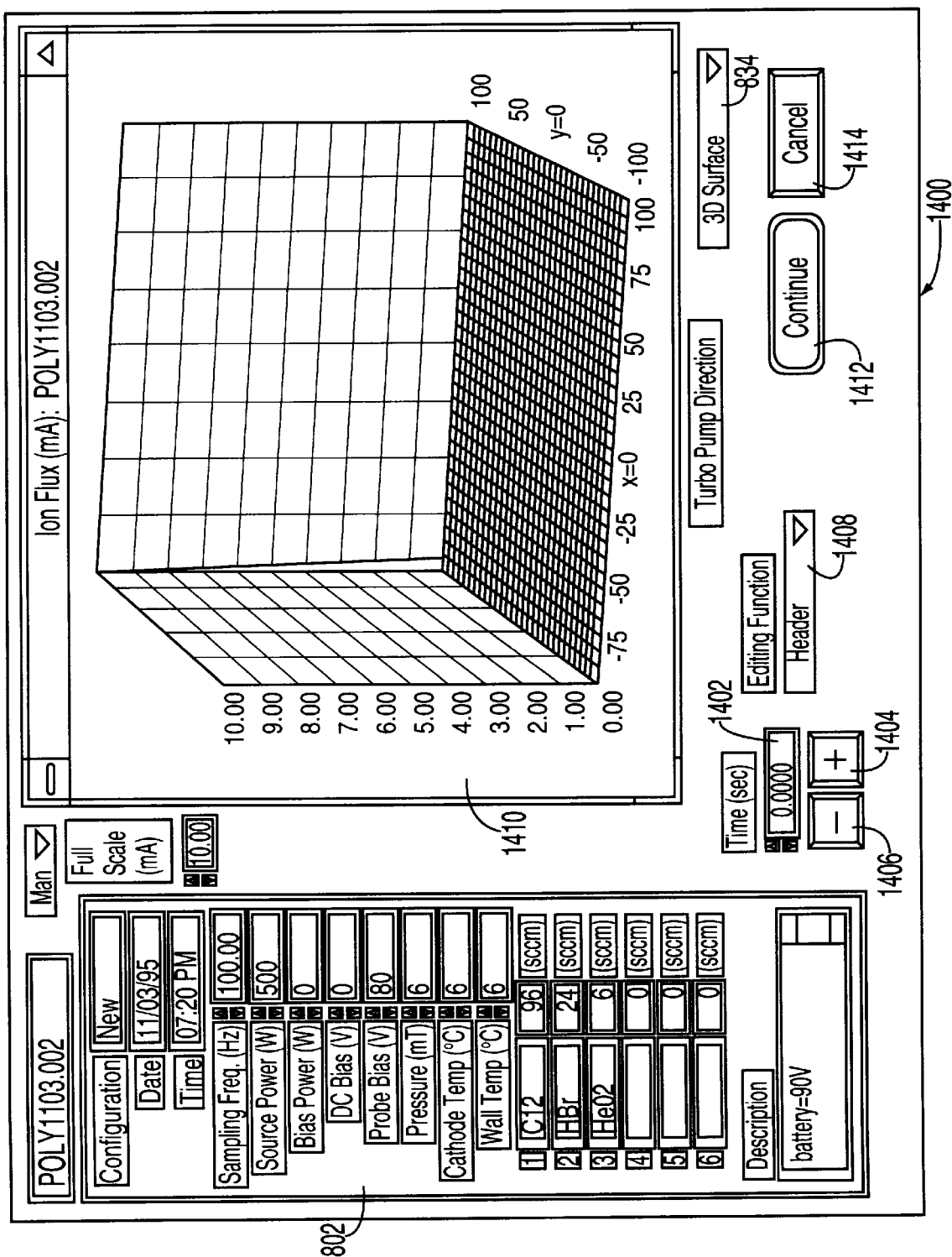
FIG. 14 depicts a default interface display for the edit data routine of FIG. 13 that enables editing of the header information.
Figure 15:
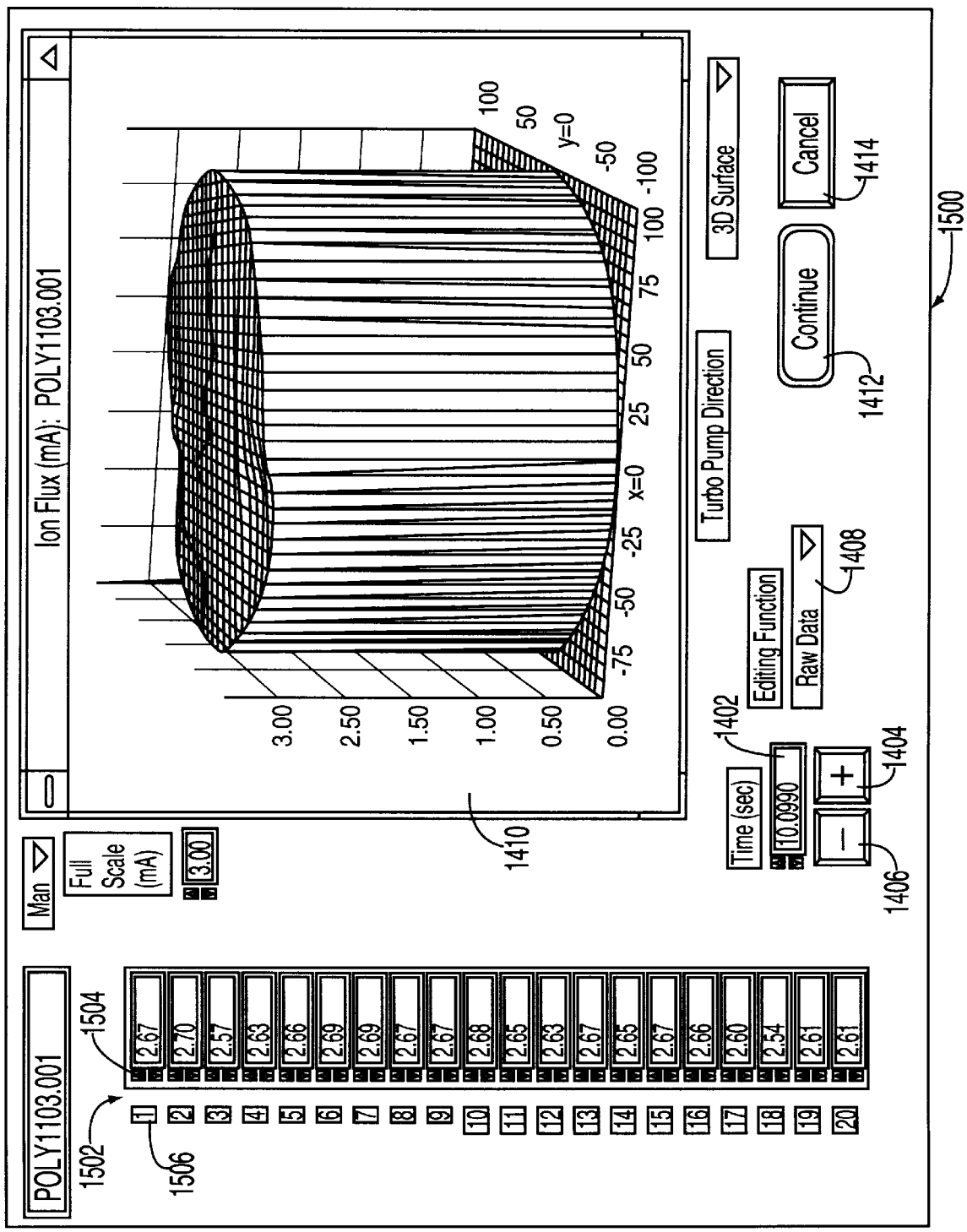
FIG. 15 depicts an interface display that enables editing of the raw data.
Figure 16:
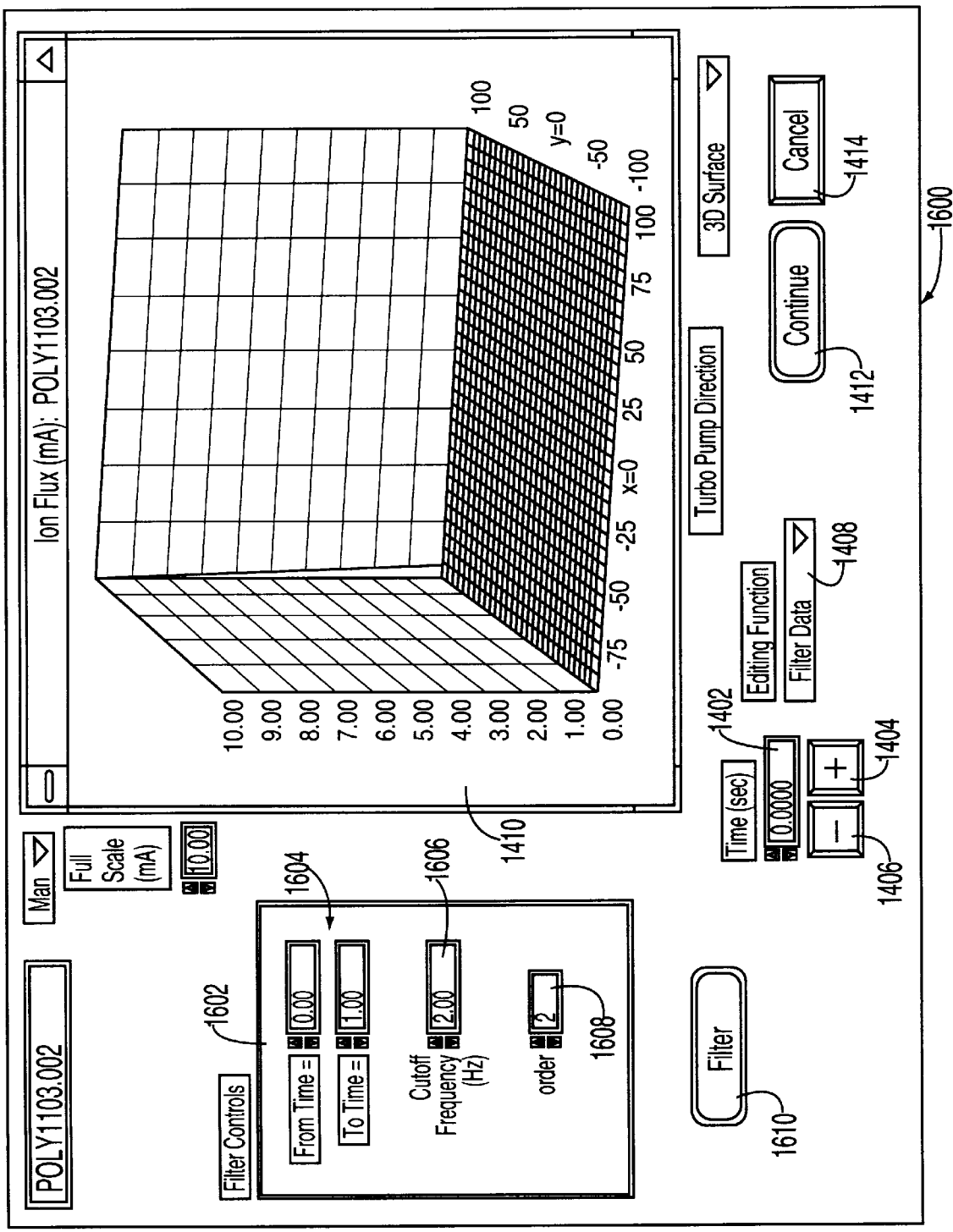
FIG. 16 depicts an interface display that enables selective filtering of the data.

Illustratively, the default path is to the parameter editing step 1306 where the parameter editing interface display 1400 of FIG. 14 is generated. The test parameter display area 802 is fully editable such that a user can alter any of the displayed parameters. The parameter modification process is represented by step 1308 of routine 306. In some instances, these parameters may vary over time, the interface display 1400 provides a time index field 1402 and two buttons 1404 and 1406 that increment and decrement the time index value. The graph area 1410 displays the data in a selected graph format at the particular time index shown in the time index window. The graph format can be changed at any time using the pull-down menu 834. The current editing function is displayed in field 1408. This field is also a pull-down menu wherein the user can select one of the other editing functions, e.g., data edit, data filtering and the like. The CONTINUE button 1412 is selected after the user has completed editing the parameters. Selecting the CONTINUE button moves the routine 306 from step 1308 to step 1318. The CANCEL button 1414 interrupts the edit data routine 306 and returns the user to the main routine.

In FIG. 13, path 1324 represents that a user can select, at any time, other editing functions from any of the interface displays. This is accomplished by the pull-down menu 1408. Selecting another function interrupts the present editing function and replaces the present interface display with the newly selected one. Changes to the present interface display that were made up to that selection point are retained such that the user can return to that display or save those changes later.

At step 1318, the routine queries whether the present changes should be saved as a new file, not saved, or used to over-write the present file. If the user does not save the file, the routine proceeds along the NO path to step 1322 and the routine returns to the main routine. However, if the user wants to save the changes, the routine proceeds to step 1320. At step 1320, the user can select the same file name as the file that was recalled in step 1302 whereby that file will be overwritten. Otherwise, a different file name can be selected and a new file will be created and saved in memory. Once the file is saved, the routine returns to the main routine.

If, at any time, the data editing function is selected in pull-down menu 834, the routine 306 proceeds to step 1310 where the test data values can be edited. Step 1310 generates the interface display 1500 of FIG. 15. This interface display contains a data display area 1502 that shows a data value for each probe (data channel index numbers 1506) at a particular time index. The time index value is shown in field 1402. In the illustrative display, there are twenty data channels. The graph area 1410 depicts a graph of the data then shown in the data area 1502. As such, a user can step through the time indices looking for a graph having anomalous values and then correct the anomalous data value(s) as needed. For example, a probe may fail and such failure could distort the graphs. The user could amend the data values of the failed probe such that the graph is "corrected". All other buttons shown in display interface 1500 operate as described previously. The data values can either be overtyped or the arrow buttons 1504 can be used to increment or decrement each value. The changes to the data values are saved as described above, e.g., executing steps 1318 and 1320.

As an extension to the point-by-point data editing function, the user can select from the pull-down menu 1408 a filtering/smoothing function that is represented as steps 1314 and 1316 in routine 306. Step 1314 generates the display interface 1600 of FIG. 16. This interface display contains the filter controls area 1602. The filter controls include a time duration over which to filter that is established by a FROM TIME and TO TIME fields 1604, a filter cutoff frequency field 1606 and a filter order field 1608. The user sets these filter parameters and then selects the FILTER button. The FILTER button executes a filtering algorithm that modifies the data values (step 1316) within the selected time period in accordance with the defined filter parameters, e.g., low pass filtering. Of course other filtering functions may be used to process the data such as bandpass, high pass, thresholding and the like. The graph area 1410 displays the filtered data at the time index shown in field 1402. The changes to the data values are saved as described above, e.g., executing steps 1318 and 1320.

Also used for data enhancement is a form of filtering known as triangular smoothing. In triangular smoothing, each three adjacent data points are averaged such that the entire data set is spatially smoothed at each time index. Triangular smoothing can be expanded to M-ary smoothing, where M, the number of data points that are averaged, is user selectable.

Another selectable filtering function is a time averaging function. When selected, the data points over a selected time period are averaged and displayed.

D. Analyze Date Routine 308

Figure 17:
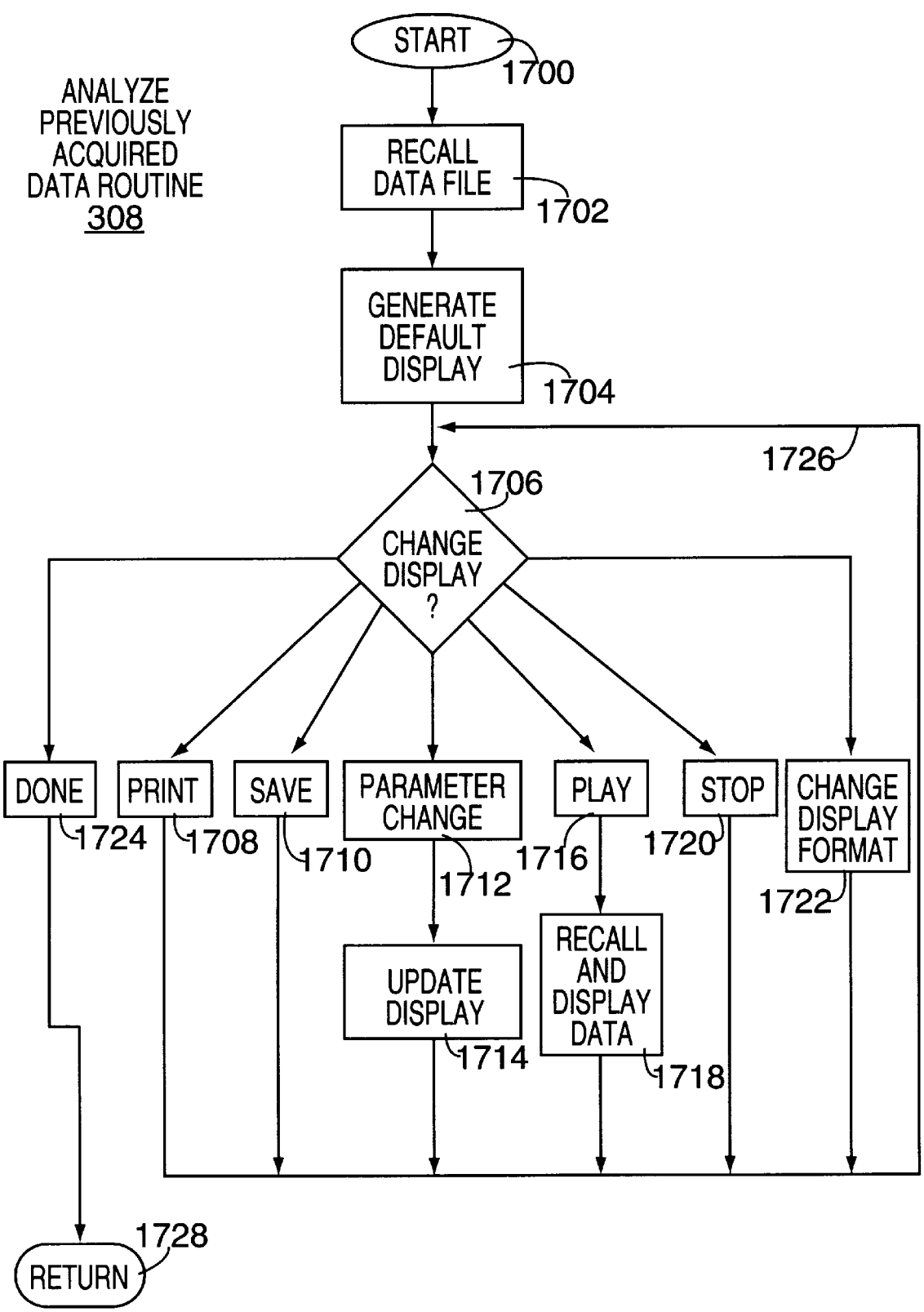
FIG. 17 depicts a flow diagram of an analyze previously acquired data routine.
Figure 18:
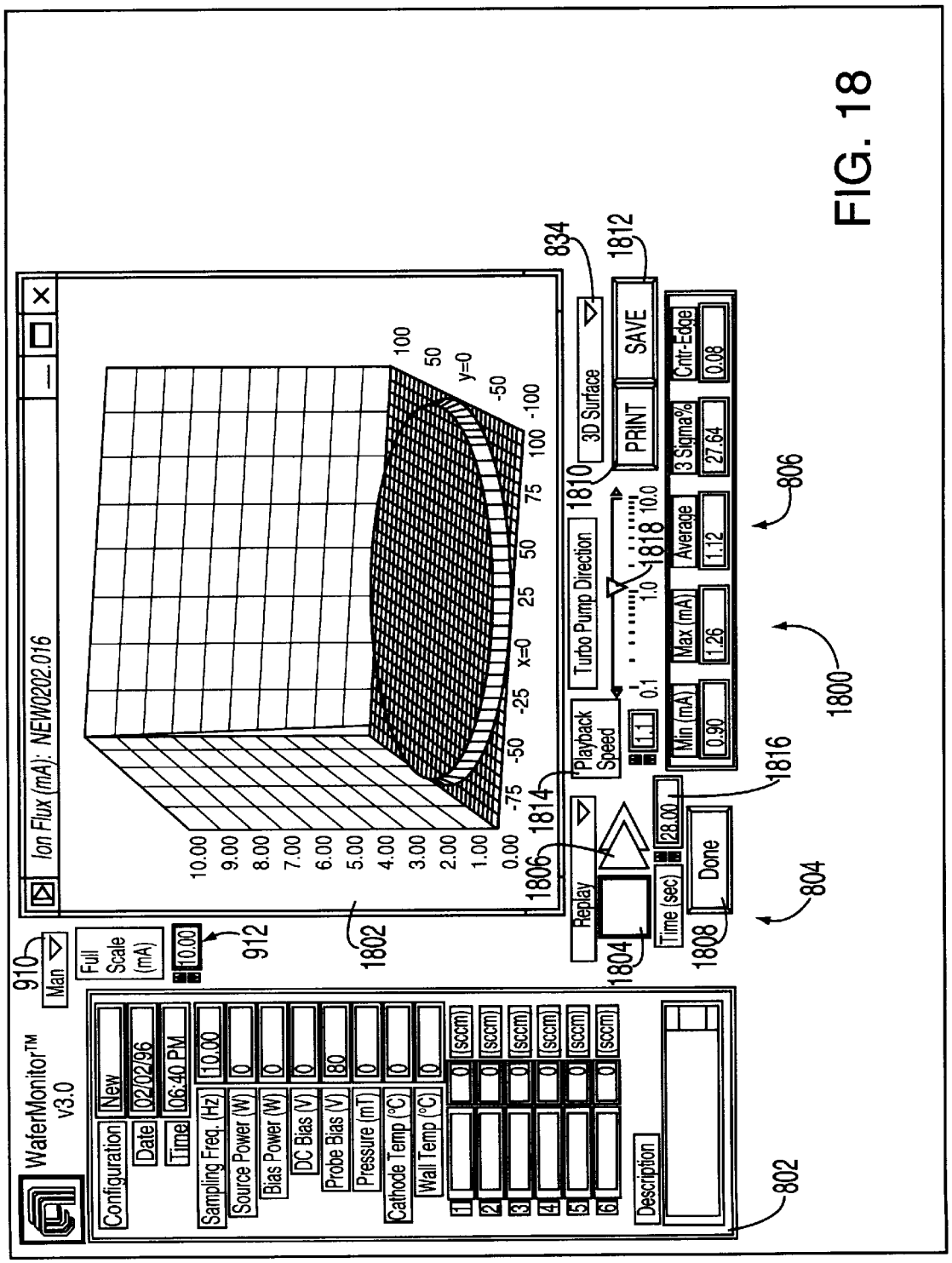
FIG. 18 depicts an interface display for controlling replay of experimental data.

FIG. 17 depicts a flow diagram of the routine 308 that is executed to analyze previously acquired data. FIG. 18 depicts an illustrative interface display 1800 that controls the execution of the routine 308. To best understand the operation of routine 308, the reader should simultaneously refer to FIGS. 17 and 18 while reading the following disclosure.

Routine 308 begins at step 1700 and proceeds to step 1702 where a user selects or enters a file name that is then recalled from memory. The data in the recalled file is used to generate, at step 1704, a default interface display such as that shown in FIG. 18. The interface display 1800 contains a test parameter display area 802, a display control button area 804, a statistics display area 806 and a graph area 1802. Once the default display interface is available, the user can select one of a number of buttons to replay the experimental data contained within the selected file. Each button on the display executes a particular interrupt routine that performs a particular function.

At step 1706, the user selects one of the interrupt buttons, e.g., STOP 1804, PLAY 1806, DONE 1808, PRINT 1810, and SAVE 1812, changes the display format using pull-down menu 834, alters a playback parameter such as playback speed 1814 or the time index 1816, or alters the graph scale parameter 912 as previously discussed.

More specifically, from step 1706, if the user selects the PRINT button 1810, the routine proceeds to print step 1708. The print step sends information for facilitating a hardcopy print out of the present display to the printer. Once the information is sent to the print driver, the routine returns along path 1726 to step 1706 to await the next user command. If the user selects the SAVE button 1812, the routine proceeds to step 1710 where the present display is saved as a data file under a user defined file name.

If the user changes any of the parameters that affect the display, e.g., the time index, the scale, or the playback speed, the routine proceeds to step 1712. The display is updated with the new display values in step 1714. If the graph changes, for example, due to a change in the scale or time index, the graph is updated. The playback speed adjusts the speed at which data is recalled from the data file and displayed. The user can enter a number in the speed field or increase or decrease the default value, e.g., 1.0, by manipulating the arrow buttons near the field. A speed of 1.0 replays the data at the same speed that it was collected. Speed values greater than 1.0 playback the data at a faster speed and a speed value of less than 1.0 playback the data at a slower speed. Also, the playback speed is adjusted by moving the "slider" 1818. Wherever on the speed scale that this slider is positioned, the playback speed field will contain the numerical representation of the position of the slider relative to the speed scale. The speed scale is logarithmically calibrated from 0.1 to 10.0.

Selecting the PLAY button 1806 executes the play step 1816 which causes, at step 1718, the data to be sequentially recalled at the defined playback speed. As the data is recalled, the graph is updated to depict a time lapse representation of the plasma intensity in one of the many available graph formats. The playback mode is continued until either the data file is exhausted of data or the STOP button 1804 is selected. The time index within the data file at which playback begins depicting data can be set by changing the time index value in the time index field 1816. Thus, a user can select a particular starting point of interest and play a specific portion of the data.

Initially the format is the default format, e.g., the 3D surface format. However, the graph format can be changed at anytime by selecting a different format in the pull-down menu 834. Such selection causes the routine 308 to proceed to step 1722 where the graph format is changed and a new graph is drawn in graph area 1802 in accordance with the display generation routine of FIG. 7. The new graph is used to display the data from that moment forward. If the user desires to stop playback, the user selects the STOP button 1804 and routine 308 enters the stop step 1720. The graph is frozen at the instant the STOP button is selected. The fact that these various functions are operate on an interrupt basis is represented by return path 1726 which the routine follows after each interrupt is executed. As such, the routine 308 processes each command than waits at step 1706 for the next command. Lastly, when the user selects the DONE button, the routine exits and returns to the main routine at step 1728.

E. Electronics Calibration Routine 310

Figure 19:
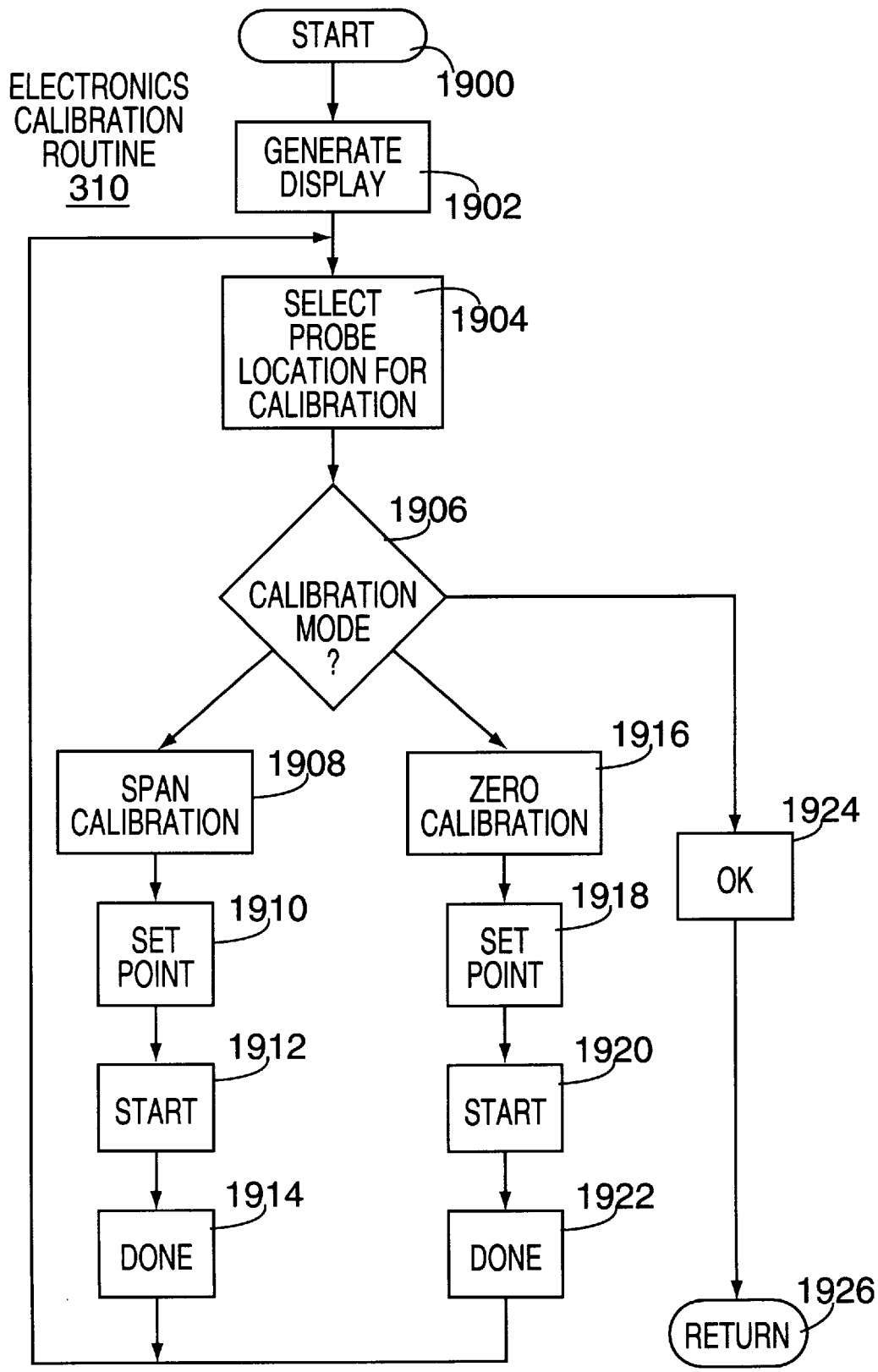
FIG. 19 depicts a flow diagram of an electronics calibration routine.
Figure 20:
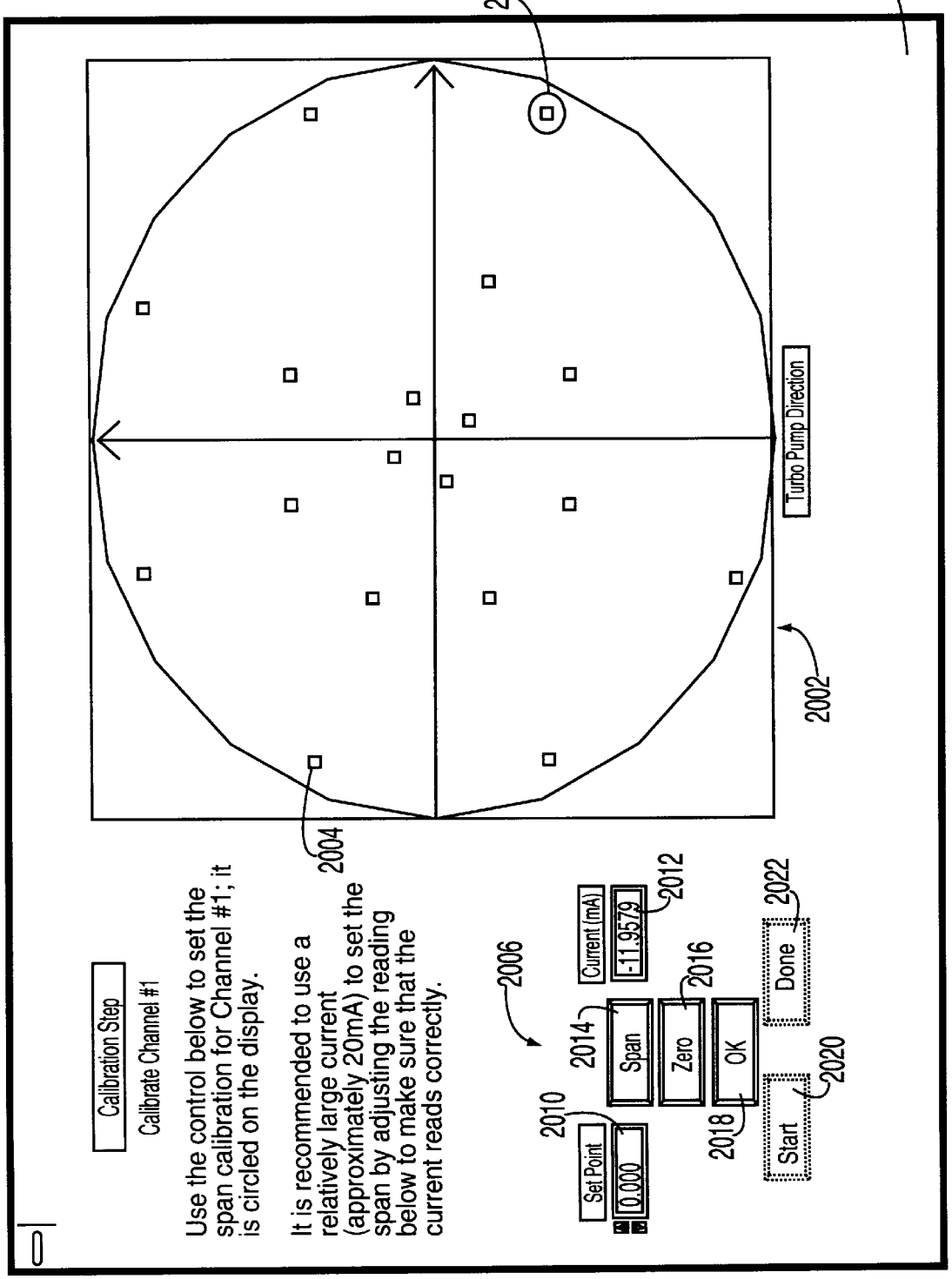
FIG. 20 depicts an interface display for controlling electronics calibration.

FIG. 19 depicts a flow diagram of the electronics calibration routine 310. FIG. 19 depicts an interface display 1900 through which the user calibrates the data acquisition electronics such that when no plasma is present the data has a value of zero and when a pre-defined magnitude of current is applied to the data acquisition electronics the data indicates that pre-defined current. To best understand the calibration routine, the reader should simultaneously refer to FIGS. 19 and 20.

Routine 310 begins at step 1900 and proceeds to step 1902 where the calibration display interface 2000 (FIG. 20) is generated. This interface contains a graphical, top plan view illustration of the sensor support 2002, e.g., a dummy wafer and a control button area 2006. Each of the probe locations is shown as a colored square 2004. Typically, each probe indicator square is a different color.

At step 1904, the user selects a probe for calibration by pointing to a particular indicator with the mouse pointer and clicking the mouse button. The display then identifies the selected probe by circumscribing the probe location with a circle 2008. To calibrate that probe, the user then selects, at step 1906, one of the control buttons. The SPAN button 2014 facilitates calibrating the probe at a high current level. The user selects the SPAN button and the routine proceeds to step 1908. The user then applies a high level current (e.g., 20 mA) to the input of the signal converter channel that connects to the selected probe. As shown in FIG. 1, the calibration current is supplied to the signal converter by a calibration current generator 105. Then the user, at step 1910, establishes the "set point" for the calibration. Typically, the set point is the current value that should be measured by electronics during the calibration. For example, if the applied span calibration current is 20 mA, then the set point value in the set point field 2010 is set to 20.00. When the SPAN button is selected, the START and DONE buttons 2020 and 2022 become available for use. Prior to selecting the SPAN button, the START and DONE buttons are only shadows and cannot be used.

Once the set point value is established, the user selects, at step 1912, the START button 2020. This button executes a calibration routine that subtracts the measured current, shown in field 2012, from the set point value. This difference, or offset, is stored as a first calibration value for that particular probe. Once calibrated, the user, at step 1914, selects the DONE button 2022. The routine then returns to step 1904, where the routine awaits the user's next command. After the DONE button is selected, the START and DONE buttons return to their shadow states.

At this point, the user can select another probe to calibrate or perform the ZERO calibration. To perform ZERO calibration, the user does not select a new probe location at step 1904, but selects the ZERO button 2016. As such, the routine proceeds to step 1916 to perform ZERO calibration and also the START and DONE buttons become activated. For this test, no input current is applied to the probe electronics and the measured current value should be zero. At step 1918, the set point value in field 2010 is set to zero and, at step 1920, the user selects the START button 2020. The calibration routine subtracts the measured current from the set point value. This difference, or offset, value is stored as a second calibration value. The calibration routine assumes the calibration curve is linear between the first and second calibration values. As such, the calibration routine computes a calibration value or curve that can produce a calibration value for any value of measured current. Of course, more calibration points could be used and/or the calibration curve could be made non-linear. Once calibrated, the user selects, at step 1922, the DONE button 2022.

At this point the user can proceed to select each probe location and calibrate each probe. When calibration is complete, the user selects the OK button 2018 and the routine proceeds through step 1924 and to return step 1926 which returns the user to the main routine. The calibration curve for each data acquisition channel is used during data acquisition to adjust each measured current value to fit the calibration curve of that data acquisition channel.

This process can be automated by using a computer controlled calibration current generator such that the computer system can automatically, once the START button is selected, apply a current to a data acquisition channel, calibrate the channel, apply the current to the next channel and so on until all the channels have been calibrated. In a further alternative, the calibration current can be simultaneously applied to all the data acquisition channels of the signal converter and the computer system can simultaneously calibrate all the channels.

The calibration curve(s) are used to generate weighting factors that correct each measured data value prior to display and storage. Consequently, all the data that is displayed and stored is "corrected" data.

F. Export Data Routine 312

Figure 21:
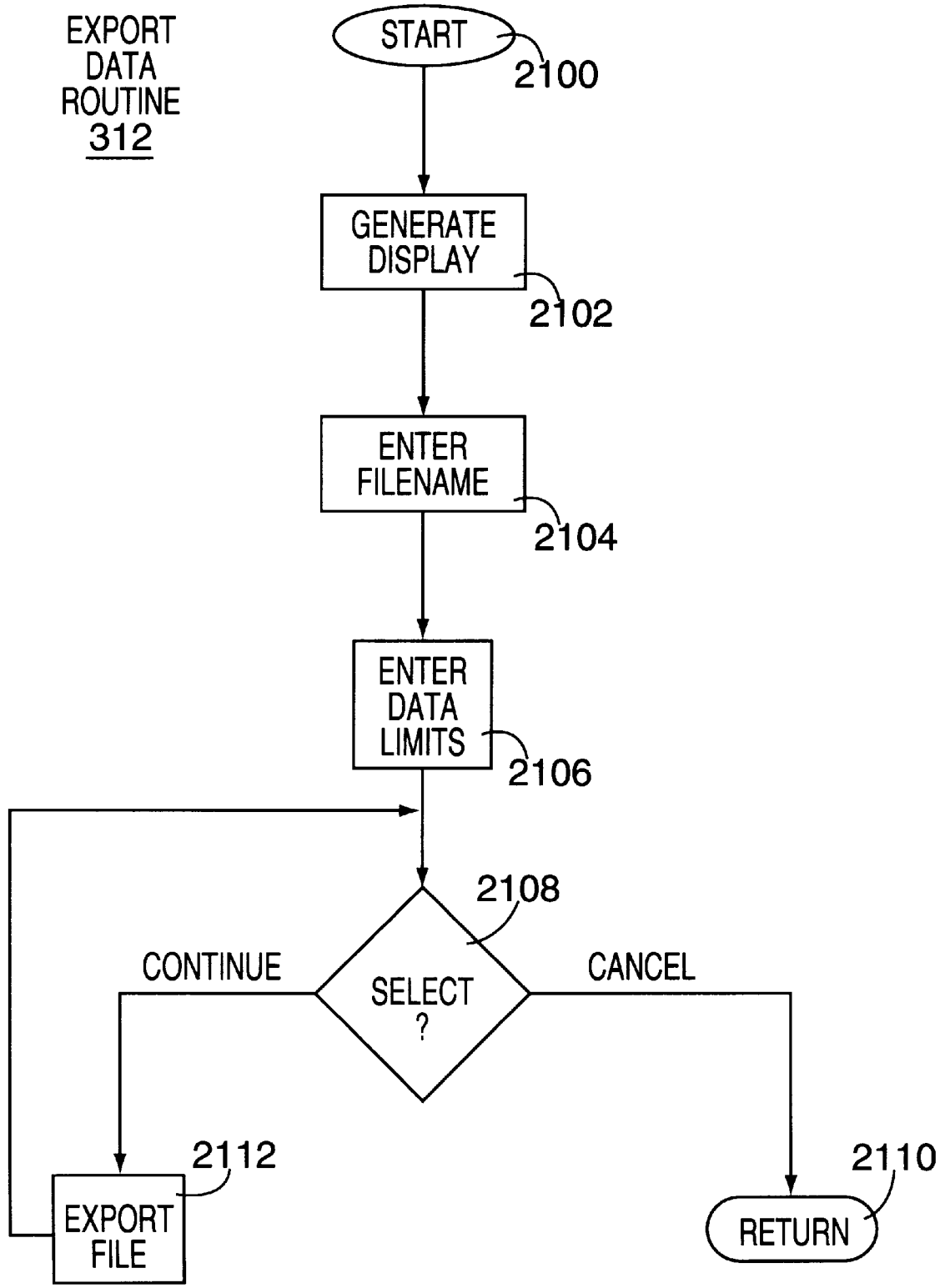
FIG. 21 depicts a flow diagram of an export data routine.
Figure 22:
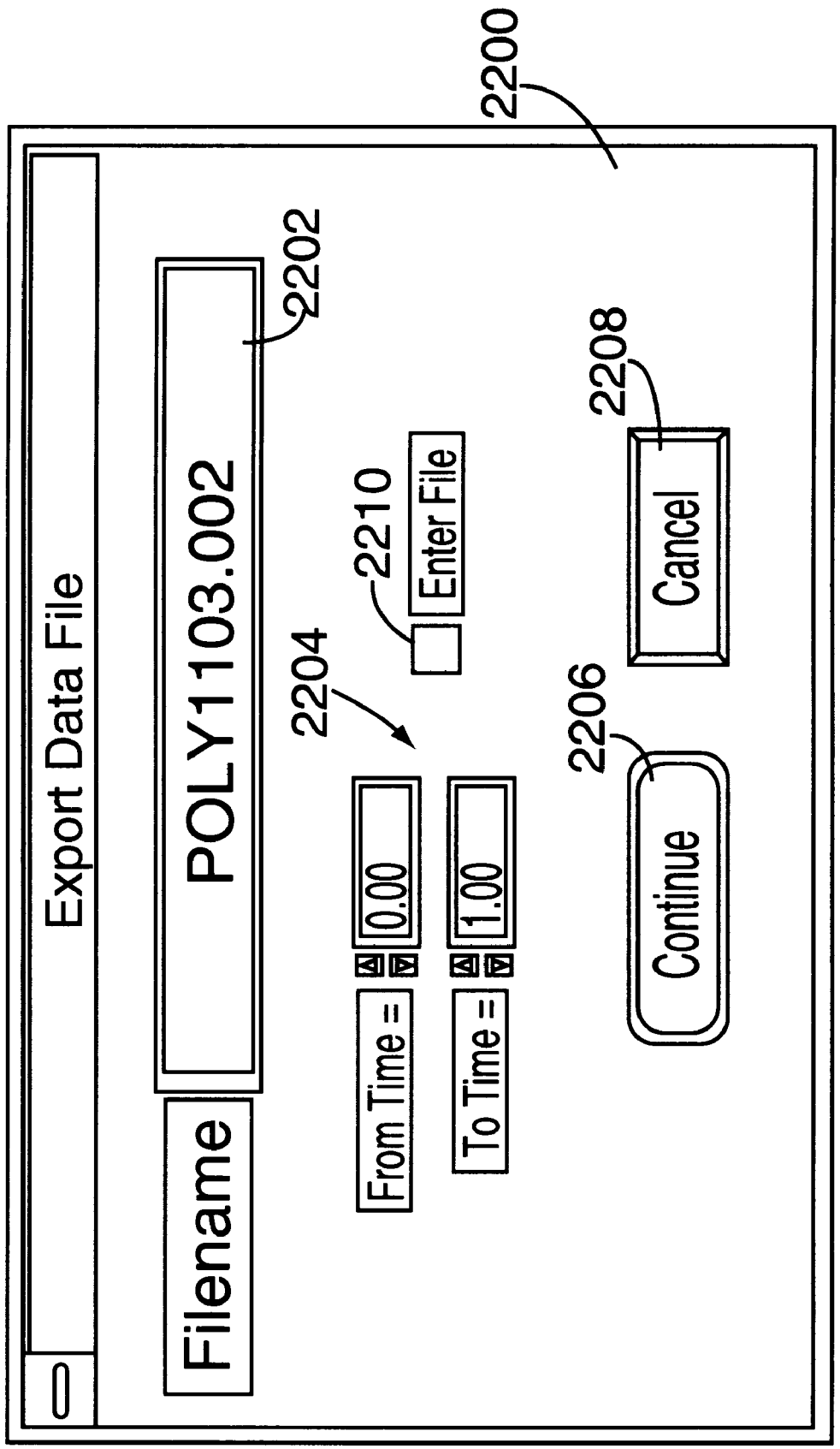
FIG. 22 depicts an interface display for exporting data to a file.

FIG. 21 depicts a flow diagram of the export data routine 312. FIG. 22 depicts a illustrative interface display that facilitates the data export function. To best understand this feature, the reader should refer to both FIGS. 21 and 22.

Routine 312 begins at step 2100 and proceeds to step 2102 where the display interface 2200 of FIG. 22 is generated. The display interface contains a filename field 2202, a plurality of data subset control fields 2204, a CONTINUE button 2206, and a CANCEL button 2208. At step 2104, the user enters into the filename field 2302 the filename of the data file to be exported. At step 2106, the user enters the data subset limits into control fields 2204. For example, the entire file can be exported by selecting the entire file check box 2210 or a limited amount of data can be exported that lies within a defined time duration. Specifically, the routine exports the data only within the time duration set by the from time and to time field values. At step 2108, the user selects either the CONTINUE button 2206 or the CANCEL button 2208. The CONTINUE button causes the routine, at step, 2112, to convert the data file, a binary file, into an ASCII text file. The ASCII file is typically stored in a file format of a popular spreadsheet program. FIG. 23 depicts a sample printout 2300 of the exported ASCII data in a spread sheet format. Note that the header information 2302 as well as the measured data 2304 is contained in the file. The data is conveniently formatted in columns representing each data channel 2306 and the time index is represented in column 2308. If the user selects, at step 2108, the CANCEL button 2208, the routine returns to the main routine.

G. Alternatives

The foregoing disclosure focused upon a system which received data from a sensor array and generated a graphical representation of that data. The test parameters were entered by hand. An alternative embodiment of this system captures these parameters by measurement.

Figure 24:
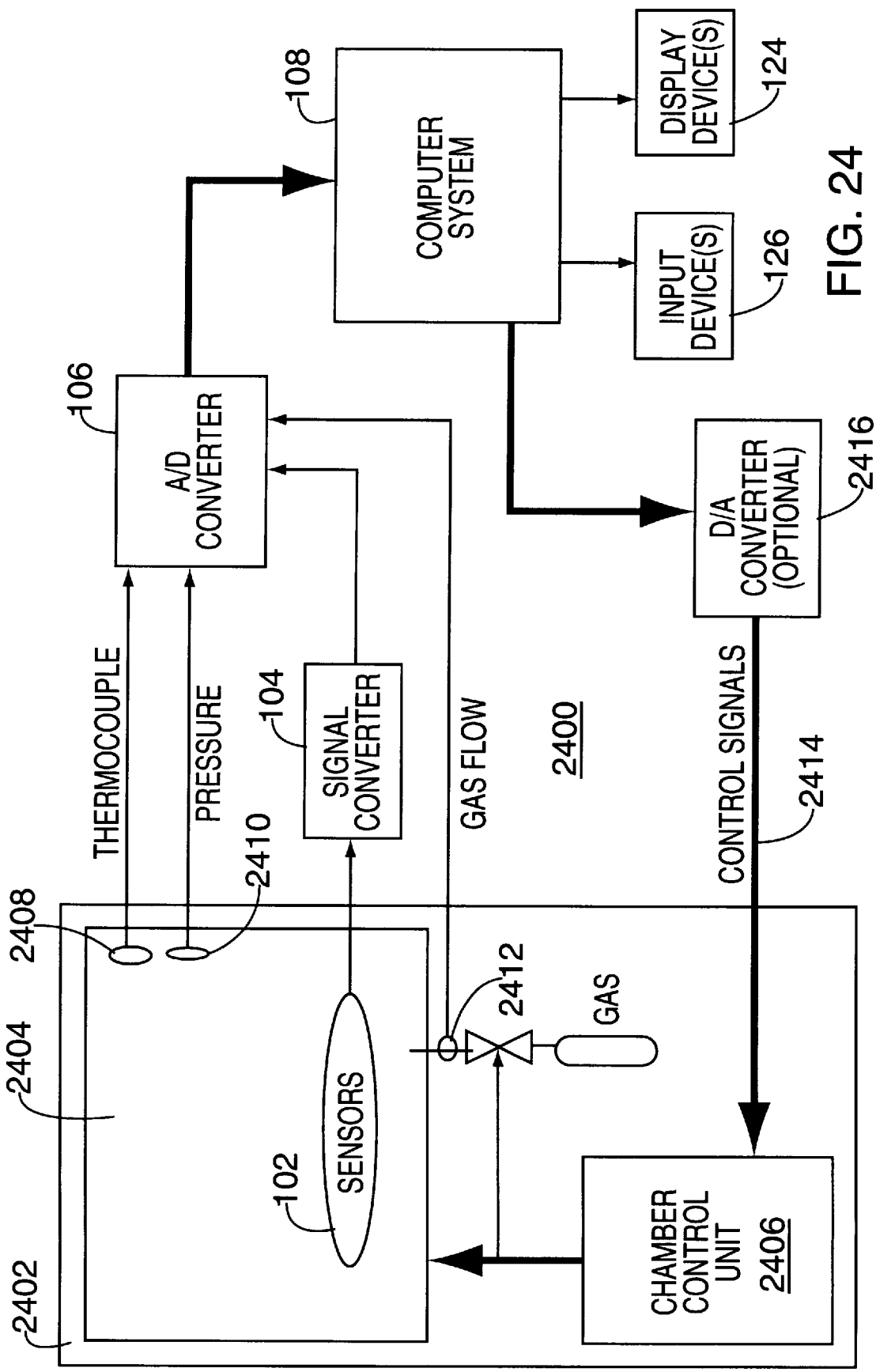
FIG. 24 depicts a block diagram of an alternative embodiment of the present invention.

FIG. 24 depicts a block diagram of an alternative embodiment of the invention. In this embodiment of the invention, the system 2400 includes a controllable plasma generator 2402 such as a semiconductor wafer processing system. As in the previous embodiment, a sensor array 102 is located in the reaction chamber 2404 and sends data to the computer 108 through a signal converter 104 and an A/D converter 106. The system also includes a plurality of sensors to measure the test parameters including one or more thermocouples 2408, a chamber pressure sensor 2410, and one or more process gas flow sensors 2412. These sensors are coupled to the A/D converter such that their analog signals are converted to a digital signal for analysis and processing by the computer system 108. The computer system displays the measured parameter values in the interface displays described above.

Additionally, the computer generates control signals for the plasma generator 2402. For example, by entering the bias voltage, source power, DC bias, and chamber pressure value into the test information interface display (FIG. 6), the computer system generates appropriate digital signals to implement these parameters. If the plasma generator uses analog control voltages, an optional D/A converter 2416 is provided to convert the digital commands into analog levels. If the plasma generator 2402 has a digital control interface, then the digital signals can be cabled directly to chamber control unit 2406 of the plasma generator. Typically, such digital control is accomplished using an RS-232 format, although other instrument control formats are available. Other sensors may be provided to achieve feedback control of the chamber parameters such that the computer system could dynamically control the plasma generator. Such dynamic control maintains the test parameters at their nominal values as conditions change within the chamber. Alternatively, the dynamic control is used to establish a process profile that is followed during the test. Such a profile includes timed changes to voltage and power levels, process gas flow, chamber temperature, chamber pressure and the like. Furthermore, the feedback control can be implemented as a neural network that can "learn" to optimize the plasma given various parameters.

In sum, the present invention provides an intuitive graphical depiction of a plasma as well as an easy to understand interface that permits plasma evaluation through various data processing and analysis techniques. The interface is also useful in test control.

Although various embodiments which incorporate the teachings of the present invention have been shown and described in detail herein, those skilled in the art can readily devise many other varied embodiments that still incorporate these teachings.

What is claimed is:

1. A system for acquiring a two-dimensional array of data, analyzing said data and displaying said data in a graphical display comprising a sensor having an array of probes, where each probe measures a particular value of a two-dimensional characteristic at a particular location relative to a plasma and produces a sensor signal;

a data processor, coupled to said sensor, for processing the sensor signal; and a display, connected to said data processor, for displaying said sensor signal as a graphical depiction of the plasma based upon the measured particular characteristic.

2. The system of claim 1 further comprising a signal converter that filters and amplifies said sensor signal.

3. The system of claim 2 wherein each of said probes is a ion current probe and said signal converter further comprises a current-to-voltage converter.

4. The system of claim 1 wherein said data processor further comprises means for running an experiment to acquire said two-dimensional data set.

5. The system of claim 4 wherein said means for running an experiment further comprises:
   means for configuring test parameters; and
   means for preparing a file header.

6. The system of claim 1 wherein said data processor further comprises means for editing said data.

7. The system of claim 1 wherein said data processor further comprises means for analyzing a previously acquired two-dimensional data set.

8. The system of claim 1 wherein said data processor further comprises means for calibrating said data generating means.

9. The system of claim 1 wherein said data processor further comprises means for exporting said two-dimensional data set.

10. The system of claim 1 wherein said display is a computer monitor.

11. A method for acquiring a two-dimensional array of data, analyzing said data and displaying said data in a graphical display comprising the steps of:
   producing a two-dimensional data set by measuring a particular characteristic of a plasma;
   processing the two-dimensional data sets
   selecting from a menu of graphical formats containing at least one format selected from the followings a three-dimensional surface graph, a two-dimensional intensity graph, a three-dimensional bar graph, a scaled three-dimensional surface graph, and a cross section of said three-dimensional surface graph; and
   displaying said data set as a graphical depiction of the plasma in a selected graphical format based upon the measured particular characteristic.

12. The method of claim 11 wherein said processing step further comprises the step of running an experiment to acquire said two-dimensional data set.

13. The method of claim 12 wherein said running step further comprises the steps of:
   configuring test parameters; and
   preparing a file header.

14. The method of claim 13 wherein said processing step further comprises the step of editing said test parameters.

15. The method of claim 11 wherein said processing step further comprises the step of editing said two-dimensional data set.

16. The method of claim 15 wherein said editing step further comprises selectively filtering said two-dimensional data set.

17. The method of claim 11 wherein said data generating step recalls a previously acquired two-dimensional data set and said processing step further comprises the step of analyzing said previously acquired two-dimensional data set.

18. The method of claim 17 wherein said analyzing step further comprises a step of:
   selecting a graphical display format for displaying said two-dimensional data set; and
   replaying said two-dimensional data set as said data set is displayed in the selected graphical format.

19. The method of claim 18 wherein said selecting step further comprises selecting from a menu of graphical formats containing at least one format selected from the following: a three-dimensional surface graph, a two-dimensional intensity graph, a three-dimensional bar graph, a scaled three-dimensional surface graph, and a cross section of said three-dimensional surface graph.

20. The method of claim 11 wherein said producing step further comprises the step of calibrating data acquisition circuitry used to perform said data producing step.

21. The method of claim 11 wherein said processing step further comprises the step of exporting said two-dimensional data set.

22. In a general purpose computer programmed for performing two-dimensional data acquisition and display, a method for acquiring a two-dimensional array of data, analyzing said data and displaying said data in a graphical display comprising the steps of:
   producing a two-dimensional data set by measuring, in real-time, a particular characteristic of a plasma;
   processing the two-dimensional data set by selecting a processing function from an interface display containing the following list of processing functions: running an experiment, editing data, and analyzing previously acquired data;
   displaying, in a graph display region on said interface display, said data set as a graphical depiction of the plasma based upon the measured particular characteristic, where said graphical depiction is formatted in a graphical format selected from a graphical menu containing the following graphical formats: a two-dimensional intensity graph, a three-dimensional bar graph, a three-dimensional surface graph, a scaled three-dimensional surface graph, a cross-section of a three-dimensional surface graph;
   displaying, in a control button region on said interface display, a plurality of control buttons; and
   displaying, in a statistical region, a plurality of statistics regarding a selected graphical display.

23. The method of claim 22 wherein, when said running an experiment is selected in said interface display, said processing step further comprises the step of generating an test information interface display for configuring test parameters and entering information for preparing a file header.

24. The method of claim 23 wherein said editing functions include editing individual data values in said recalled data set, filtering said recalled data set using selected filter parameters, and editing information in a file header of the recalled data set.

25. The method of claim 22 wherein, when said editing data is selected in said interface display, said processing step further comprises the steps of:
   recalling a two-dimensional data set from memory;
   generating a editing interface display containing, in said control button region, a graphical menu for selecting an editing function and a time index display field for depicting a present time index of a data set being displayed.

26. The method of claim 22 wherein, when said analyzing previously acquired data is selected in said interface display, said processing step further comprises the steps of:
   recalling a two-dimensional data set from memory;
   generating an analyzing interface display containing, in said control button region, a graphical menu for selecting a data playback function and a time index display field for depicting a present time index of a data set being displayed.

27. In a system for displaying a two-dimensional array of data, an interface display comprising:
   a test configuration display region for displaying information regarding an experiment used to acquire the two-dimensional array of data;

a graph display region for displaying a graphical depiction of the two-dimensional array of data in a selected graphical format, wherein said selected graphical format is selected using a menu in said control button region, where said menu contains at least one of the following graphical formats: an intensity graph, a three-dimensional bar graph, a three-dimensional surface graph, a scaled three-dimensional surface graph, and a cross-section of a three-dimensional surface graph;

a control button region for displaying a plurality of control buttons used to control the graphical format and the two-dimensional array of data; and a statistics display region for displaying statistical information regarding the two-dimensional array of data.

28. The interface display of claim 27 wherein said statistics display region contains a maximum graph value, a minimum graph value, an average graph value, a three-sigma standard deviation value, and a center-to-edge deviation value for the selected graphical format.

29. The interface display of claim 27 wherein the control button region contains buttons and menus that control the sequencing of data from the two-dimensional array of data being depicted in the graph region.

30. In a system for generating a plasma within a reaction chambers apparatus for monitoring and controlling said plasma comprising:

a sensor having an array of probes, where each probe measures a particular value of a two-dimensional characteristic at a particular location relative to said plasma and produces information regarding said plasma and reaction chamber environmental conditions;

a data processor, coupled to said sensor, for processing said information and for utilizing plasma control commands that are produced in response to said information to generate plasma control signals; and a chamber control unit, connected to said data processor and said reaction chamber, for controlling said reaction chamber environmental conditions in response to said plasma control signals.

31. The apparatus of claim 30 wherein said plasma control commands are entered into a test information interface display containing a plurality of data fields that define the plasma control signals.

32. The apparatus of claim 31 wherein said data fields are compared to said acquired information regarding said plasma and the reaction chamber environmental conditions to produce plasma control signals that optimize the plasma.

33. The apparatus of claim 30 wherein said plasma control commands are computer generated commands.

* * * * *